United States Patent
Takeuchi et al.

(10) Patent No.: US 9,684,464 B2
(45) Date of Patent: Jun. 20, 2017

(54) SEMICONDUCTOR STORAGE DEVICE AND CONTROL METHOD FOR SAME

(71) Applicant: CHUO UNIVERSITY, Hachioji-shi, Tokyo (JP)

(72) Inventors: Ken Takeuchi, Yokohama (JP); Shuhei Tanakamaru, San Jose, CA (US)

(73) Assignee: CHUO UNIVERSITY, Tokyo (JP)

( * ) Notice: Subject to any disclaimer, the term of this patent is extended or adjusted under 35 U.S.C. 154(b) by 0 days.

(21) Appl. No.: 14/648,022

(22) PCT Filed: Nov. 21, 2013

(86) PCT No.: PCT/JP2013/006852
§ 371 (c)(1),
(2) Date: May 28, 2015

(87) PCT Pub. No.: WO2014/083811
PCT Pub. Date: Jun. 5, 2014

(65) Prior Publication Data
US 2015/0309744 A1 Oct. 29, 2015

(30) Foreign Application Priority Data

Nov. 30, 2012 (JP) ................................ 2012-263033

(51) Int. Cl.
*G06F 3/06* (2006.01)
*G06F 11/10* (2006.01)
(Continued)

(52) U.S. Cl.
CPC ............ *G06F 3/0619* (2013.01); *G06F 3/064* (2013.01); *G06F 3/065* (2013.01); *G06F 3/0685* (2013.01);
(Continued)

(58) Field of Classification Search
CPC . G11C 11/5642; G09G 5/222; G06F 11/1068; G06F 11/2056; G06F 2212/1016;
(Continued)

(56) References Cited

U.S. PATENT DOCUMENTS 5,005,174 A * 4/1991 Bruckert ................ G06F 1/12
714/11
5,255,367 A * 10/1993 Bruckert ................ G06F 1/12
713/375
(Continued)

FOREIGN PATENT DOCUMENTS

JP S60-63651 A 4/1985
JP H06-282449 A 10/1994
(Continued)

OTHER PUBLICATIONS

Jan. 7, 2014 International Search Report issued in International Patent Application No. PCT/JP2013/006852.
(Continued)

*Primary Examiner* — Phung M Chung
(74) *Attorney, Agent, or Firm* — Oliff PLC

(57) ABSTRACT

A semiconductor storage device includes at least one memory from among a primary memory, a mirror memory storing data corresponding to data stored in the primary memory, and a buffer memory; and a controller that controls the at least one memory so as to store data in the at least one memory and read data from the at least one memory.

4 Claims, 32 Drawing Sheets

(51) Int. Cl.
*G06F 11/20* (2006.01)
*G11C 29/44* (2006.01)
*G06F 11/16* (2006.01)

(52) U.S. Cl.
CPC ...... *G06F 11/1012* (2013.01); *G06F 11/1068* (2013.01); *G06F 11/1076* (2013.01); *G06F 11/1666* (2013.01); *G06F 11/2056* (2013.01); *G06F 2211/1009* (2013.01)

(58) Field of Classification Search
CPC ...... G06F 3/0619; G06F 3/064; G06F 3/0685; G06F 3/065; G06F 11/1012; G06F 11/1666; G06F 11/20; G06F 11/201; G06F 2212/262; G06F 3/0626; G06F 3/0689; H03M 13/09; H03M 13/2927; Y10S 707/99932
See application file for complete search history.

(56) References Cited

U.S. PATENT DOCUMENTS 7,774,537 B2 * 8/2010 Pyeon ................. G06F 13/4243
710/52
8,996,796 B1 * 3/2015 Karamcheti .......... G06F 12/121
711/103
2010/0275056 A1 * 10/2010 Pyeon ................. G06F 13/4243
714/6.12

FOREIGN PATENT DOCUMENTS

| | | |
|---|---|---|
| JP | H07-281961 A | 10/1995 |
| JP | 2002-244932 A | 8/2002 |
| JP | 2006-163811 A | 6/2006 |
| JP | 2009-294869 A | 12/2009 |

OTHER PUBLICATIONS

Mike Ault; "Oracle and RAID Usage;" Burleson Consulting; accessed Nov. 22, 2012; http://www.dba-oracle.com/oracle_tips_raid_usage.htm.
Nov. 13, 2015 International Preliminary Report on Patentability issued in International Patent Application No. PCT/JP2013/006852.
Jun. 20, 2016 Office Action issued in Korean Patent Application No. 10-2015-7014282.
Feb. 20, 2017 Office Action issued in Chinese Patent Application No. 201380071951.1.

* cited by examiner

FIG. 12

|  | Case 1 | Case 2 | Case 3 | Case 4 | Case 5 |
|---|---|---|---|---|---|
| Lower page data of primary memory (error direction) | 1 | 1 | 0 (1→0) | 0 (1→0) | 0 |
| Upper page data of mirror memory after bit re-flipping (error direction) | 1 | 0 (1→0) | 1 | 0 (1→0) | 0 |
| Data match | Yes | No | No | Yes | Yes |
| Output | 1 | 1 | 1 | 0 | 0 |

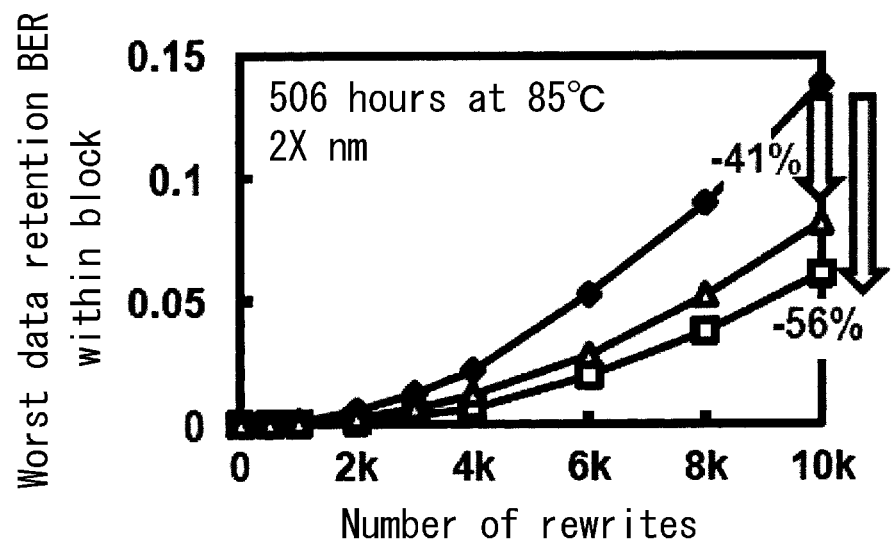
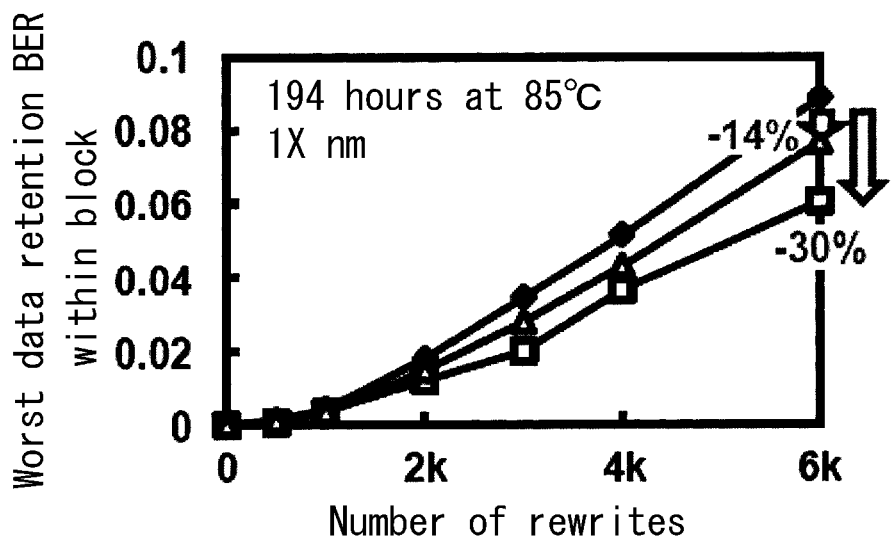

FIG. 31

| Rate of improvement | Allowable BER | Allowable number of rewrites | Allowable data retention time |
|---|---|---|---|
| Conditions with data retention errors as the primary error source | ×6.2 | ×2 | ×34 |
| Conditions with write errors as the primary error source | ×32 | ×4.2 | N/A |

PRIOR ART

SEMICONDUCTOR STORAGE DEVICE AND CONTROL METHOD FOR SAME

CROSS-REFERENCE TO RELATED APPLICATION

This application claims priority to and the benefit of Japanese Patent Application No. 2012-263033 filed Nov. 30, 2012, the entire contents of which are incorporated herein by reference.

TECHNICAL FIELD

This disclosure relates to a semiconductor storage device and a control method for the same, and in particular to a semiconductor storage device provided with a non-volatile memory and a control method for the same.

BACKGROUND

In recent years, for example in corporations that handle big data, demand has increased for use, in storage systems, of solid state drives (SSDs) that are high speed and low in power consumption.

As in the example illustrated in FIG. 32, a conventional storage system is configured as a multilevel hierarchy with servers, disk arrays, SSDs, NAND flash memories, and the like. At each level of the hierarchy, data is provided with redundancy and error correction is performed, thereby improving reliability.

A variety of types of Redundant Arrays of Independent Disks (RAID) have also been proposed as techniques for combining a plurality of memory devices to improve reliability (for example, see Mike Ault, "Oracle and RAID Usage" (NPL 1)).

CITATION LIST

Non-Patent Literature

NPL 1: Mike Ault, "Oracle and RAID Usage."

In a storage system handling big data, data is often copied across hierarchical levels. Many conventional storage systems, however, are highly redundant and inefficient, since such systems have many hierarchical levels, each having an independent controller, and are optimized for redundancy and error correction of data.

Therefore, it could be helpful to provide a semiconductor storage device, and a control method for the same, that is highly reliable and can efficiently control an SSD at one hierarchical level.

SUMMARY

To resolve the above problems, one of our semiconductor storage devices includes at least one memory from among a primary memory, a mirror memory storing data corresponding to data stored in the primary memory, and a buffer memory; and a controller configured to control the at least one memory so as to store data in the at least one memory and read data from the at least one memory.

In the above semiconductor storage device, the controller preferably includes: an error correction coder configured to perform error correction coding on data received from a host; a page RAID unit configured to calculate a parity bit in a bit line direction and store the parity bit in the buffer memory each time a page of data is written to the error correction coder; a reverse mirror unit configured to store data received from the page RAID unit in the primary memory and the mirror memory, wherein the reverse mirror unit stores the received data without change in the primary memory, and stores the received data in the mirror memory after reordering the received data; an error reduction unit configured to read data from the primary memory and the mirror memory, wherein the error reduction unit reads first data from the primary memory, reads second data corresponding to the first data from the mirror memory, outputs the first data when the first data and the second data match, and outputs data, when the first data and the second data do not match, obtained by inferring that a bit error occurred in a dominant direction in one of the first data and the second data; an error correction decoder configured to perform error correction decoding on data received from the error reduction unit; and an error masking unit configured to receive, from the error correction decoder, error position information acquired upon error correction decoding, wherein the error masking unit stores the error position information in one of the buffer memory, the primary memory, and the mirror memory, and reads the error position information from one of the buffer memory, the primary memory, and the mirror memory and provides the error position information to the error correction decoder when the error correction decoder performs error correction decoding on data.

To resolve the above problems, another one of our semiconductor storage devices includes a primary memory; a mirror memory storing data corresponding to data stored in the primary memory; and a controller configured to store received data in the primary memory and the mirror memory, wherein the controller stores the received data without change in the primary memory, and stores the received data in the mirror memory by controlling, based on a predetermined rule, a page storing the received data.

To resolve the above problems, another one of our semiconductor storage devices includes a primary memory; a mirror memory storing data corresponding to data stored in the primary memory; and a reverse mirror unit configured to store received data in the primary memory and the mirror memory, wherein the reverse mirror unit stores the received data without change in the primary memory, and stores the received data in the mirror memory after reordering the received data.

To resolve the above problems, another one of our semiconductor storage devices includes a primary memory; a mirror memory storing data corresponding to data stored in the primary memory; and a shift mirror unit configured to store received data in the primary memory and the mirror memory, wherein the shift mirror unit stores the received data without change in the primary memory, and stores the received data in the mirror memory by shifting a page storing the received data.

To resolve the above problems, another one of our semiconductor storage devices includes a primary memory; a mirror memory storing data corresponding to data stored in the primary memory; and an error reduction unit configured to read data from the primary memory and the mirror memory, wherein the error reduction unit reads first data from the primary memory, reads second data corresponding to the first data from the mirror memory, outputs the first data when the first data and the second data match, and outputs data, when the first data and the second data do not match, obtained by inferring that a bit error occurred in a dominant direction in one of the first data and the second data.

To resolve the above problems, another one of our semiconductor storage devices includes a buffer memory; an error correction coder configured to perform error correction coding on data received from a host; and a page RAID unit configured to calculate a parity bit in a bit line direction and store the parity bit in the buffer memory each time a page of data is written to the error correction coder.

To resolve the above problems, another one of our semiconductor storage devices includes an error correction decoder configured to perform error correction decoding on received data; and an error masking unit configured to receive, from the error correction decoder, error position information acquired upon error correction decoding, wherein the error masking unit stores the error position information in memory, and reads previous error position information from the memory and provides the previous error position information to the error correction decoder when the error correction decoder performs error correction decoding on data.

To resolve the above problems, our method of controlling a semiconductor storage device is a method of controlling a semiconductor storage device provided with at least one memory from among a primary memory, a mirror memory storing data corresponding to data stored in the primary memory, and a buffer memory, the method including: storing data in the at least one memory by controlling the at least one memory; and reading data from the at least one memory by controlling the at least one memory.

We thus provide a semiconductor storage device, and a control method for the same, that is highly reliable and can efficiently control an SSD at one hierarchical level.

BRIEF DESCRIPTION OF THE DRAWINGS

In the accompanying drawings:

FIG. 12 illustrates an example of the error reduction unit, according to one of the disclosed embodiments, determining output;

FIG. 15A is a graph comparing the dependency of data retention BER on the number of rewrites;

FIG. 15B is a graph comparing the dependency of data retention BER on the number of rewrites;

FIG. 31 is a table summarizing the effects in this disclosure; and

DETAILED DESCRIPTION

Embodiments of our devices and methods are described below with reference to the drawings.

[Overall Structure]

Figure 1:
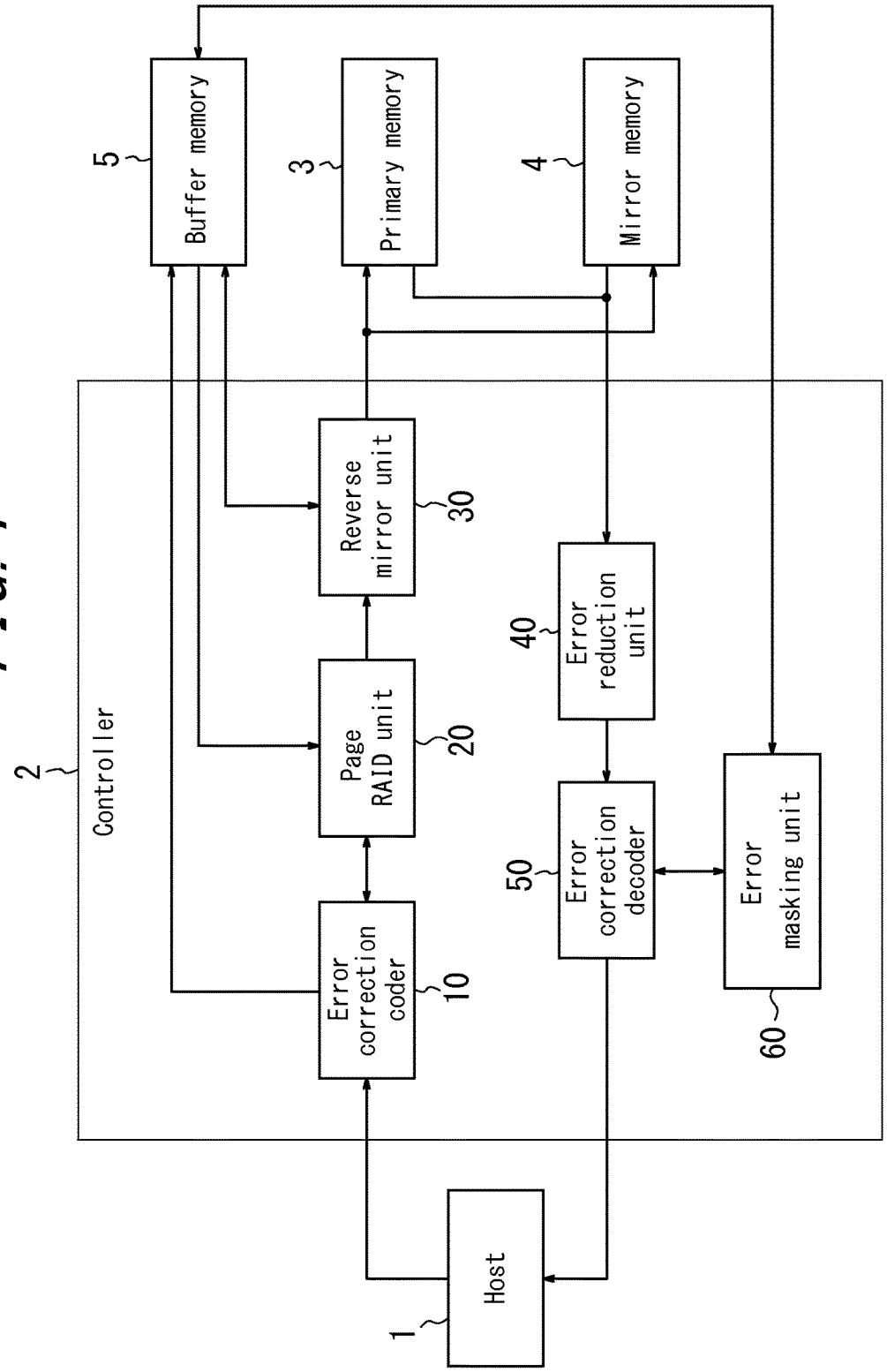
FIG. 1 schematically illustrates the structure of a semiconductor storage device according to one of the disclosed embodiments.

FIG. 1 schematically illustrates the structure of a semiconductor storage device according to one of the disclosed embodiments. As illustrated in FIG. 1, the semiconductor storage device includes a host 1, controller 2, primary memory 3, mirror memory 4, and buffer memory 5.

In FIG. 1, the primary memory 3, mirror memory 4, and buffer memory 5 are simplified, and only one of each is illustrated. This is merely a simplified drawing, however, and a plurality of each of the primary memory 3, mirror memory 4, and buffer memory 5 may be provided.

As illustrated in FIG. 1, in a semiconductor storage device according to one of the disclosed embodiments, the primary memory 3, mirror memory 4, and buffer memory 5 do not form a hierarchical structure. Therefore, the controller 2 can control the primary memory 3, mirror memory 4, and buffer memory 5 collectively without duplication of the same functions.

At the time of writing data, the controller 2 performs processing, such as error correction coding, on data received from the host 1 and stores the result in the primary memory 3. For redundant storage of data, the controller 2 stores, in the mirror memory 4, data corresponding to the data stored in the primary memory 3. Processing performed by the controller 2 other than error correction coding is described below.

At the time of reading data, the controller 2 reads data from the primary memory 3 and the mirror memory 4. The controller 2 performs processing such as error correction decoding and the like on the received data and provides the host 1 with the data on which processing such as error correction decoding has been performed. Processing other than error correction decoding performed by the controller 2 is described below.

The primary memory 3 and the mirror memory 4 are non-volatile memories, such as NAND flash memories. In order to increase reliability, corresponding data are stored in both the primary memory 3 and the mirror memory 4.

The buffer memory 5 is a memory used when temporarily storing data. Data are frequently written to and read from the buffer memory 5 by the controller 2. Therefore, for the buffer memory 5, it is preferable to use Resistance Random Access Memory (ReRAM) or the like that has a short write/read time and that can be rewritten a large number of times. The buffer memory 5 need not be ReRAM, however, and a variety of memories may be used, such as NAND flash memory, Dynamic Random Access Memory (DRAM), Magnetoresistive Random Access Memory (MRAM), Phase Change Random Access Memory (PCRAM), Ferroelectric Random Access Memory (FeRAM), and the like.

In this embodiment, a separate memory from the primary memory 3 and the mirror memory 4 is used as the buffer memory 5, yet a region within the primary memory 3 and/or the mirror memory 4 may be used as buffer memory.

The controller 2 includes an error correction coder 10, a page RAID unit 20, a reverse mirror unit 30, an error reduction unit 40, an error correction decoder 50, and an error masking unit 60.

At the time of writing data, the error correction coder 10 performs error correction coding on the data received from the host 1. Next, the page RAID unit 20 generates a parity bit using an exclusive OR (XOR) operation. The reverse mirror unit 30 applies reverse mirroring to the data and stores the original data and the reverse mirrored data respectively in the primary memory 3 and the mirror memory 4. The technical significance of "reverse mirroring" is described below. Generation of a parity bit with an XOR operation is only an example, and the page RAID unit 20 may generate a parity bit with a different operation.

At the time of reading data, the error reduction unit 40 reads data from the primary memory 3 and the mirror memory 4. Next, the error correction decoder 50 performs error correction decoding. The error correction decoder 50 provides the error masking unit 60 with error position information acquired at the time of error correction decoding. The error correction decoder 50 also receives the error position information at the time of the previous read from the error masking unit 60 and corrects data at the error position.

Details on the functions of each block in the controller 2 are described in detail below.

[Reverse Mirroring]

Figure 2:
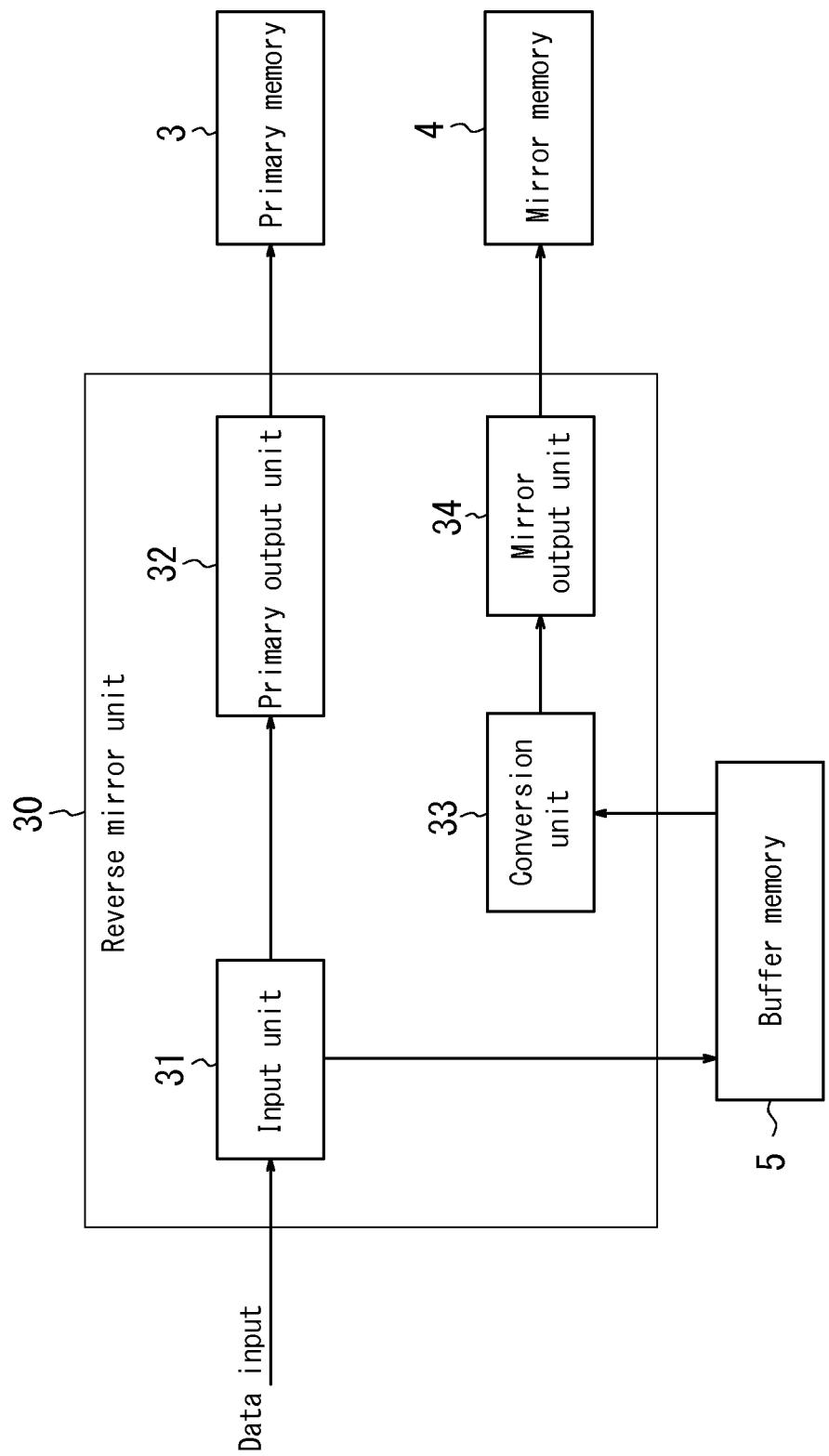
FIG. 2 schematically illustrates the structure of a reverse mirror unit according to one of the disclosed embodiments.

FIG. 2 schematically illustrates the structure of the reverse mirror unit 30 according to one of the disclosed embodiments. As illustrated in FIG. 2, the reverse mirror unit 30 includes an input unit 31, a primary output unit 32, a conversion unit 33, and a mirror output unit 34.

Upon receiving data, the input unit 31 provides the primary output unit 32 and the buffer memory 5 with the data. The primary output unit 32 stores the received data without change in the primary memory 3.

The conversion unit 33 reads data in reverse order from the buffer memory 5 and provides the mirror output unit 34 with the data. The mirror output unit 34 stores the reversed order data in the mirror memory 4. While the conversion unit 33 has been described as receiving data from the input unit 31 via the buffer memory 5, the buffer memory 5 is not essential. Instead, the conversion unit 33 may receive data directly from the input unit 31 and reverse the order of the data.

The following describes the technical significance of data being stored in the primary memory 3 and the mirror memory 4 in reverse order as a result of the conversion unit 33 reversing the order of the data.

Figure 3:
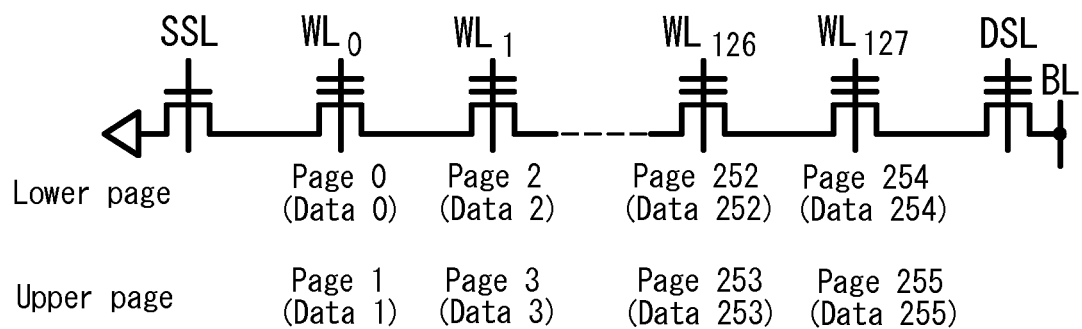
FIG. 3 illustrates an example of the structure of NAND flash memory.

FIG. 3 illustrates an example of the structure of a Multiple Level Cell (MLC) NAND flash memory having two bits per memory cell. As illustrated in FIG. 3, in MLC NAND flash memory with two bits per memory cell, each memory cell has a lower page and an upper page and stores two bits of data. In the example in FIG. 3, there are 128 memory cells along the bit line direction. Hence, there are two times as many pages, i.e. 256 pages, and 256 bits of data are stored. Unless otherwise specified, the primary memory 3 and the mirror memory 4 are assumed below to be MLC NAND flash memory with two bits per memory cell and to have page numbers from 0 to 255.

Figure 4:
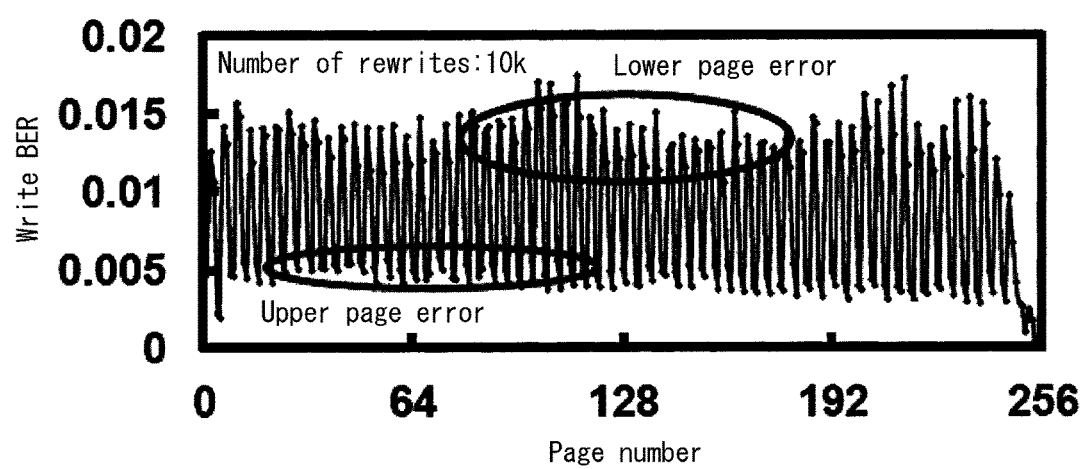
FIG. 4 is a graph illustrating the dependency of write BER on upper/lower pages.

FIG. 4 is a graph in which the horizontal axis represents the page number and the vertical axis represents the Bit Error Rate (BER) of data written after the data have been rewritten a predetermined number of times (referred to below as "write BER"). FIG. 4 illustrates the results of measuring BER when the number of rewrites is 10 k ($10 \times 10^3$).

As illustrated in FIG. 4, in the NAND flash memory, the write BER of data written into the upper page is smaller than the write BER of data written into the lower page. Therefore, all of the data are preferably read from the upper page.

Figure 5:
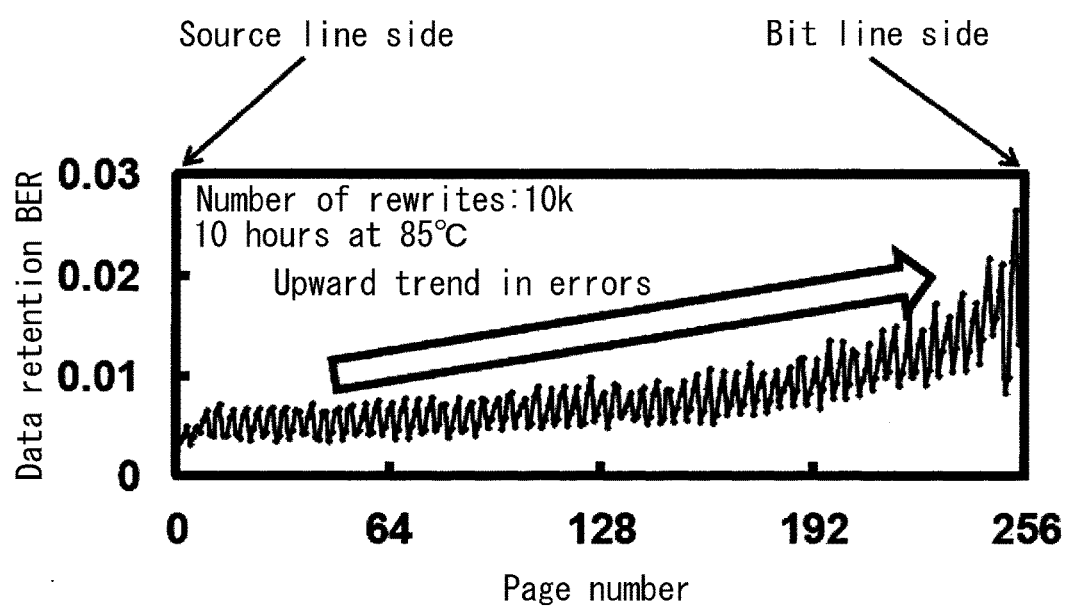
FIG. 5 is a graph illustrating the dependency of data retention BER on page number.

FIG. 5 is a graph in which the horizontal axis represents the page number and the vertical axis represents the BER upon elapse of a predetermined time at a high temperature after data have been rewritten a predetermined number of times (referred to below as "data retention BER"). FIG. 5 illustrates the results of measuring BER upon elapse of 10 hours at 85° C. after rewriting 10 k times.

As illustrated in FIG. 5, the data retention BER tends to worsen in NAND flash memory as the page number grows larger. Accordingly, all of the data are preferably read from pages on the smaller page number side.

Figure 6:
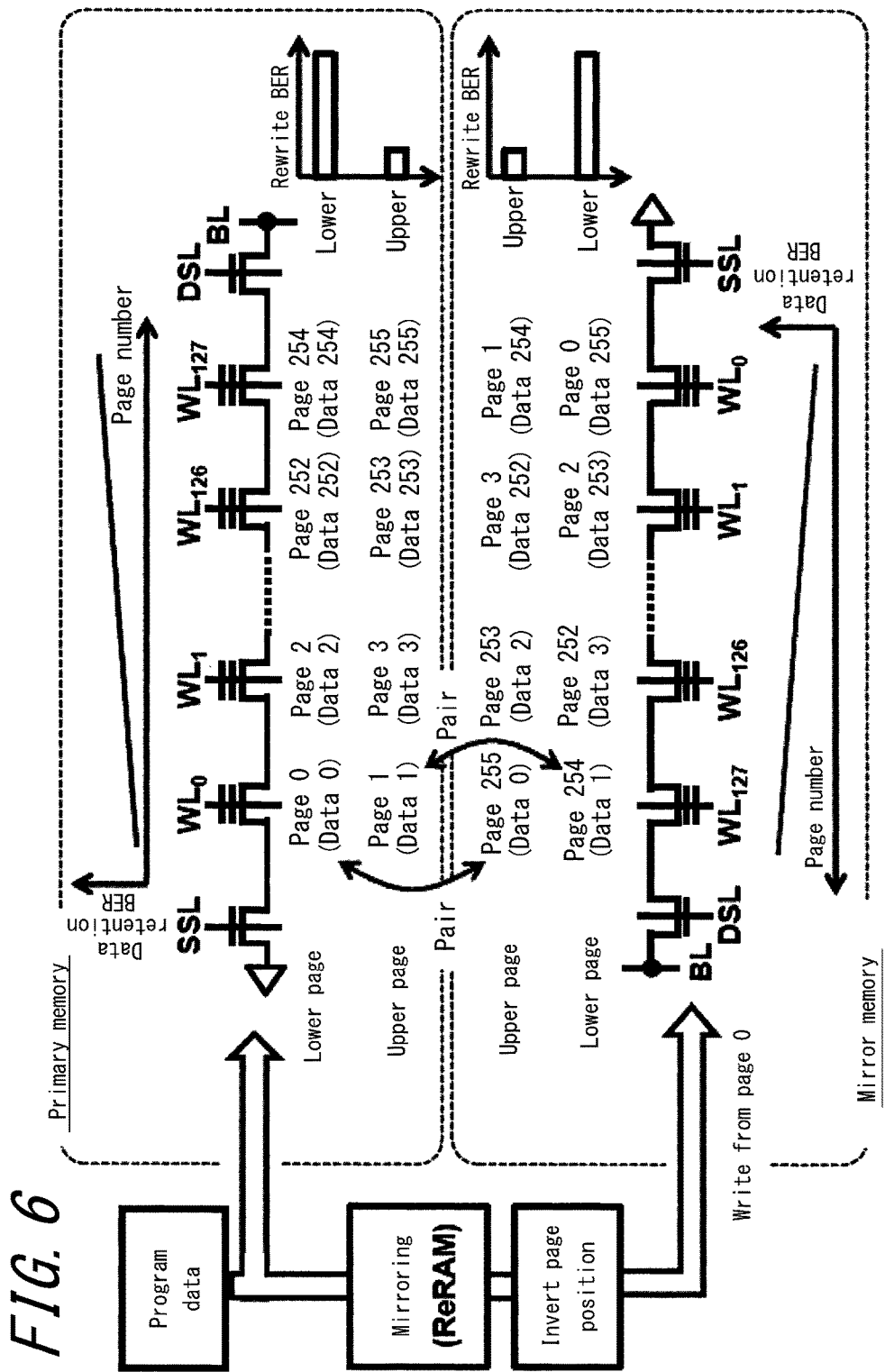
FIG. 6 illustrates an example of storing data in primary memory and mirror memory.

FIG. 6 illustrates storing, in the mirror memory 4, data that are in the reverse order from the primary memory 3. As illustrated in FIG. 6, data 0 to data 255 are stored in the mirror memory 4 at page 0 to page 255 in the order of data 255 to data 0. This way, the data that were recorded in a lower page in the primary memory 3 are stored in an upper page in the mirror memory 4. For example, data 0 is stored in a lower page (page 0) in the primary memory 3 yet is stored in an upper page (page 255) in the mirror memory 4.

Furthermore, the data that were recorded in a page with a large page number in the primary memory 3 are stored in a page with a small page number in the mirror memory 4. For example, data 255 is stored in page 255 in the primary memory 3 yet is stored in page 0 in the mirror memory 4.

Figure 7A:
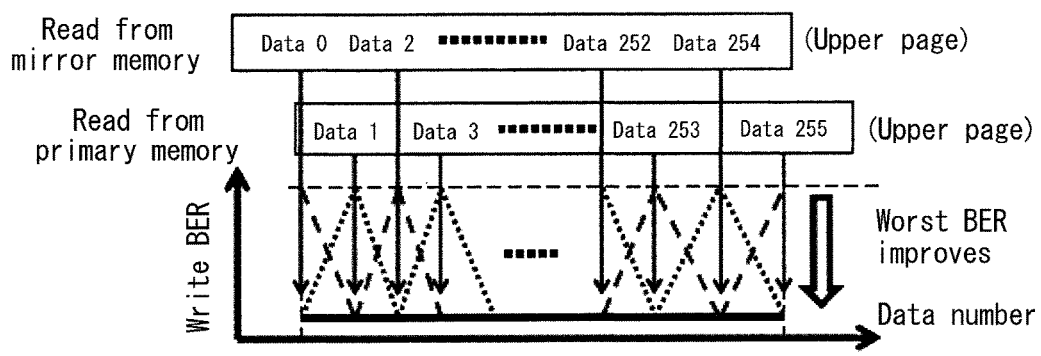
FIG. 7A is an example of a method for reading data under conditions with write errors as the primary error source.

FIG. 7A illustrates an example of a read method to improve the worst BER under conditions in which write errors are the primary error source (referred to below as "conditions with write errors as the primary error source"). The worst BER refers to the largest BER among all of the page numbers. As illustrated in FIG. 7A, odd-numbered data (data 1, data 3, . . . ) are read from the primary memory 3, and even-numbered data (data 0, data 2, . . . ) are read from the mirror memory 4. Hence, all of the data can be read from upper pages, thereby improving the worst BER.

Figure 7B:
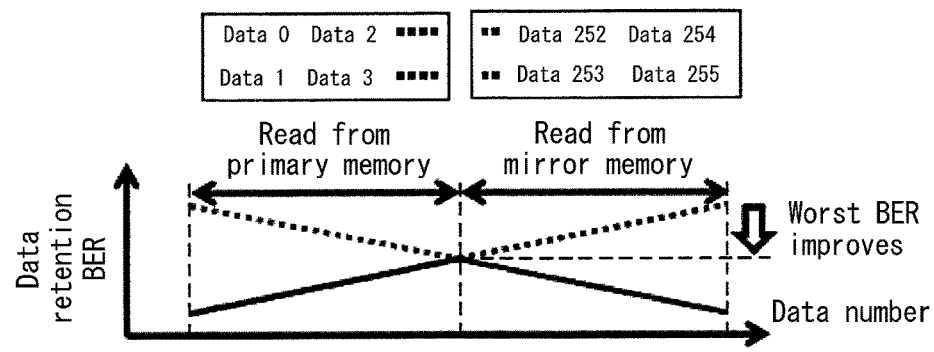
FIG. 7B is an example of a method for reading data under conditions with data retention errors as the primary error source.

FIG. 7B illustrates an example of a read method to improve the worst BER under conditions in which data retention errors are the primary error source (referred to below as "conditions with data retention errors as the primary error source"). As illustrated in FIG. 7B, data 0 to 127 are read from the primary memory 3, and data 128 to 255 are read from the mirror memory 4. Hence, all of the data can be read from pages on the smaller page number side, thereby improving the worst BER.

Figure 8A:
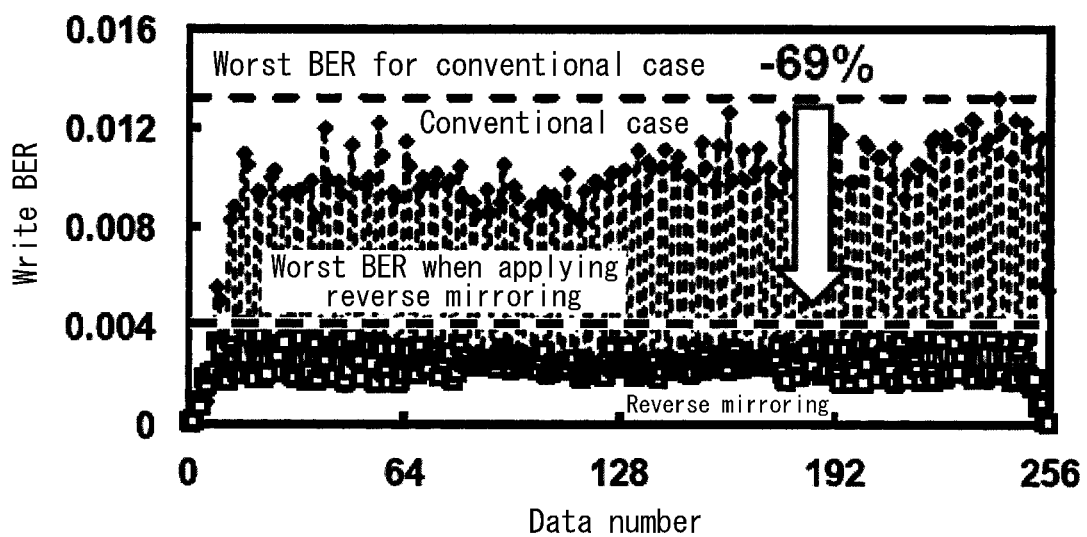
FIG. 8A is a graph illustrating improvement in BER when applying reverse mirroring under conditions with write errors as the primary error source.

FIG. 8A is a graph comparing the write BERs, under conditions with write errors as the primary error source, for a conventional case and for the case of applying reverse mirroring. Black squares indicate measurement results for the conventional case, and white squares indicate measurement results upon applying reverse mirroring. As illustrated in FIG. 8A, the worst BER improved by 69% upon applying reverse mirroring.

Figure 8B:
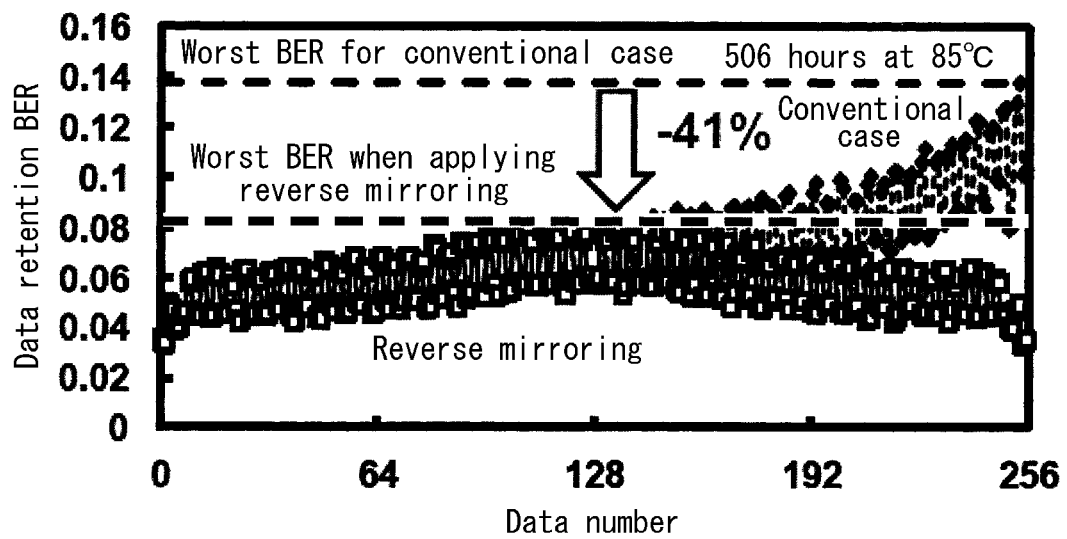
FIG. 8B is a graph illustrating improvement in BER when applying reverse mirroring under conditions with data retention errors as the primary error source.

FIG. 8B is a graph comparing the data retention BERs, under conditions with data retention errors as the primary error source, for a conventional case and for the case of applying reverse mirroring. Black squares indicate measurement results for the conventional case, and white squares indicate measurement results upon applying reverse mirroring. As illustrated in FIG. 8B, the worst BER improved by 41% upon applying reverse mirroring.

By thus applying reverse mirroring and reading all of the data from upper pages or from pages on the smaller page number side, the worst BER can be improved. The choice between the two read methods can be made in accordance with whether the goal is to reduce write errors or data retention errors.

A method for storing data in the mirror memory 4 in reverse order has been described above, yet this is merely a non-limiting example. The optimal method of storing data may change depending on the characteristics of the primary memory 3 and the mirror memory 4. The reverse mirror unit 30 reorders data to achieve the optimal order in accordance with the characteristics of the primary memory 3 and the mirror memory 4 and then stores the data in the mirror memory 4.

Also, the method of reading data only from upper pages and the method of reading data only from pages on the smaller page number side are merely non-limiting examples. The optimal method of reading data may change depending on the characteristics of the primary memory 3 and the mirror memory 4. For example, it may be the case that if the primary memory 3 and the mirror memory 4 have the property that the BER is smaller as the page number is larger, the data are preferably read from the larger page number side.

In this embodiment, when the conversion unit 33 works together with the below-described error reduction unit 40 to reduce the worst BER, the data stored in the mirror memory 4 are not only reversed in order, but also the bits of the data are flipped. Here, flipping a bit means that a data bit of "0" is set to "1", and a data bit of "1" is set to "0". The technical significance of the conversion unit 33 flipping bits is described below in the explanation of the error reduction unit 40.

[Error Reduction]

Figure 9:
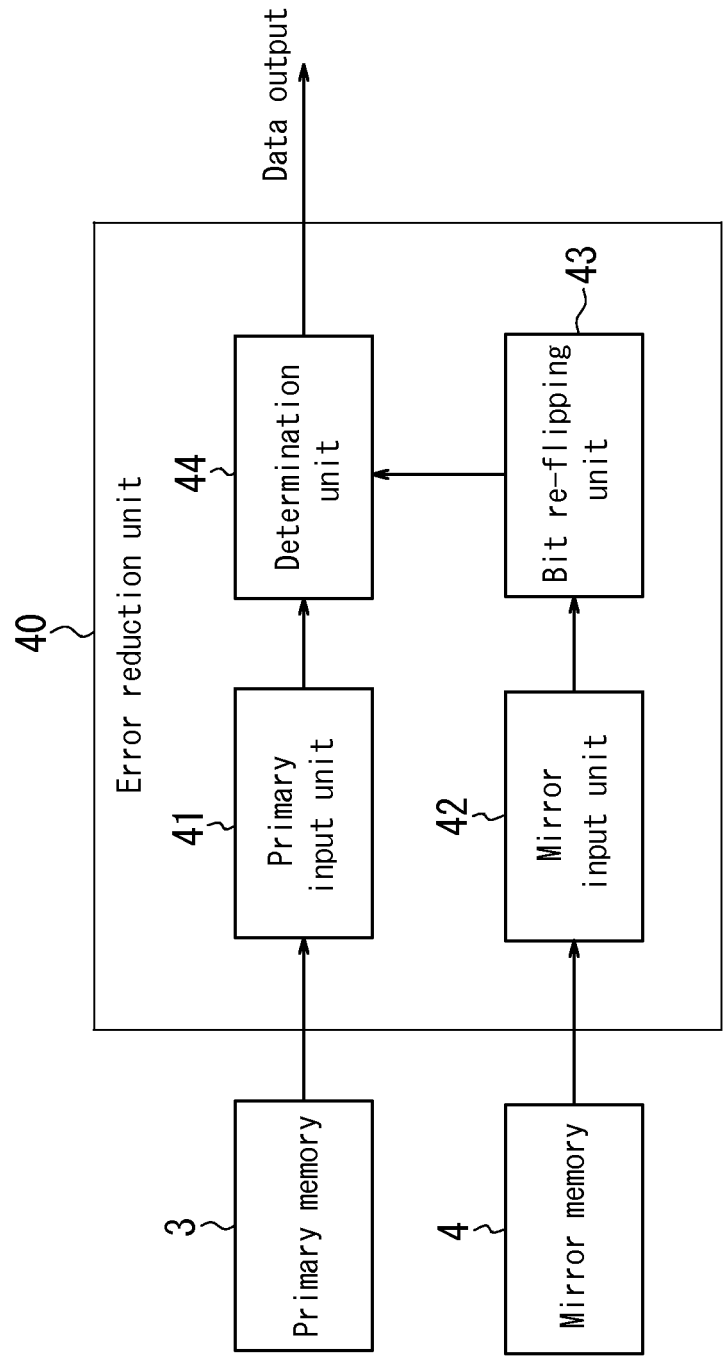
FIG. 9 schematically illustrates the structure of an error reduction unit according to one of the disclosed embodiments.

FIG. 9 schematically illustrates the structure of the error reduction unit 40 according to one of the disclosed embodiments. As illustrated in FIG. 9, the error reduction unit 40 includes a primary input unit 41, a mirror input unit 42, a bit re-flipping unit 43, and a determination unit 44.

The primary input unit 41 reads data from the primary memory 3 and provides the data to the determination unit 44.

The mirror input unit 42 reads data from the mirror memory 4 and provides the data to the bit re-flipping unit 43.

The bit re-flipping unit 43 flips the bits of the data received from the mirror input unit 42 and provides the flipped data to the determination unit 44. The bit re-flipping unit 43 flips the bits in order to restore the original data by re-flipping the data stored in the mirror memory 4, the bits of which were flipped by the reverse mirror unit 30. When the error reduction unit 40 works together with the reverse mirror unit 30 in order to reduce the BER, the technical significance of having the reverse mirror unit 30 flip bits and store the result in the mirror memory 4 and having the error reduction unit 40 re-flip the bits of the data read from the mirror memory 4 is described below.

The determination unit 44 compares the data received from the primary input unit 41 and the bit re-flipping unit 43 and determines which data are inferred to be correct, outputting the inferred data. The way in which the determination unit 44 determines the data inferred to be correct is described below in the explanation of the flowchart in FIG. 11.

The following explains the technical significance of bit flipping by the reverse mirror unit 30 and of bit re-flipping by the error reduction unit 40.

Figure 10:
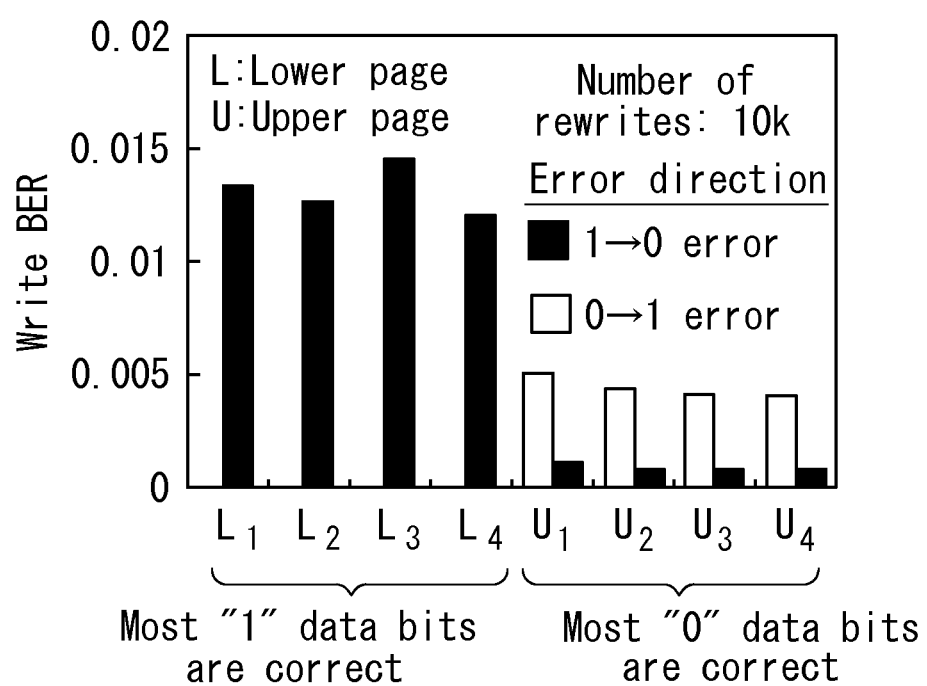
FIG. 10 illustrates asymmetry in the error direction in the write BER of NAND flash memory.

FIG. 10 illustrates asymmetry in the error direction in the write BER of NAND flash memory. As illustrated in FIG. 10, in the lower pages, the error direction of "1" becoming "0" dominates, whereas in the upper pages, the error direction of "0" becoming "1" dominates.

The reverse mirror unit 30 stores data so that upper pages and lower pages form pairs between the primary memory 3 and the mirror memory 4. Accordingly, the data stored in lower pages (upper pages) of the primary memory 3 are stored in upper pages (lower pages) of the mirror memory 4.

As a result, if data are stored in the mirror memory 4 without the reverse mirror unit 30 flipping bits, for example the dominant error direction is opposite for the data stored in lower pages of the primary memory 3 and the data stored in upper pages of the mirror memory 4. In this case, when the data read from the primary memory 3 and from the mirror memory 4 do not match, it cannot be inferred whether the correct data bit is "0" or "1".

Therefore, by having the reverse mirror unit 30 flip the bits of data stored in the mirror memory 4, the dominant error direction becomes the same for the primary memory 3 and the mirror memory 4. As a result, when the data read from the primary memory 3 and the mirror memory 4 do not match, it can be inferred which of the data bits 0 and 1 is correct by inferring that an error occurred in either the primary memory 3 or the mirror memory 4 in the dominant direction.

In this case, since the reverse mirror unit 30 flips bits and then stores data in the mirror memory 4, the error reduction unit 40 re-flips bits to restore the data.

Figure 11:
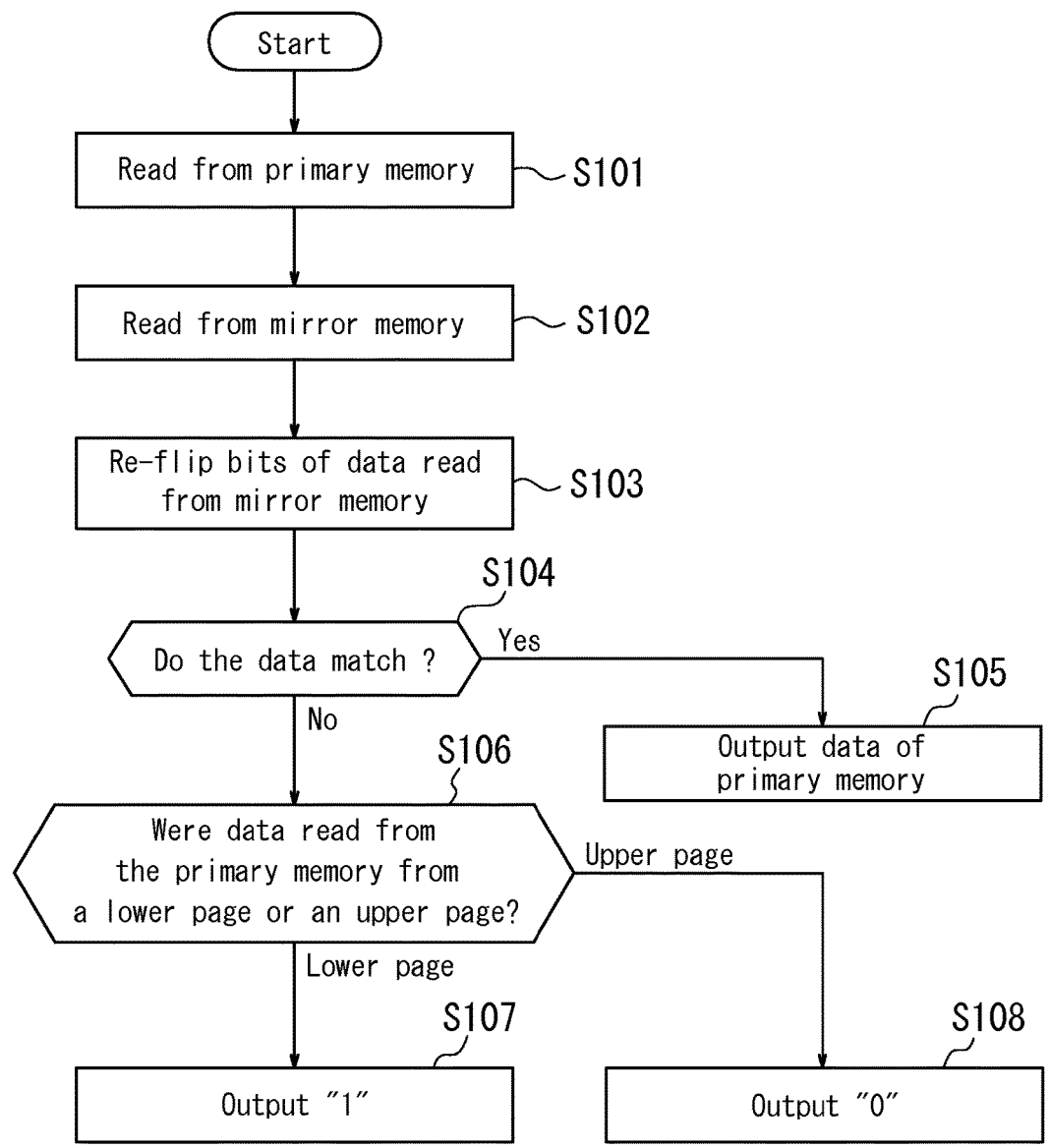
FIG. 11 is a flowchart illustrating processing by the error reduction unit according to one of the disclosed embodiments.

As described above, the error direction in the write BER of NAND flash memory exhibits strong asymmetry. Therefore, when the data read from the primary memory 3 and the mirror memory 4 do not match, the error reduction unit 40 can infer the correct data. The flowchart in FIG. 11 illustrates the procedure by which the error reduction unit 40 infers the correct data.

The primary input unit 41 reads data from the primary memory 3 (step S101). The mirror input unit 42 reads the corresponding data from the mirror memory 4 (step S102). Steps S101 and S102 may be performed in reverse order or simultaneously.

The bit re-flipping unit 43 re-flips the bits of the data received from the mirror input unit 42 and provides the result to the determination unit 44 (step S103).

The determination unit 44 determines whether the data received from the primary input unit 41 and the data received from the bit re-flipping unit 43 match (step S104).

In step S104, when the data are determined to match, the determination unit 44 infers that an error did not occur in either the primary memory 3 or the mirror memory 4 and outputs the data that were stored in the primary memory 3 (step S105).

In step S104, when determining that the data do not match, the determination unit 44 determines whether the data read from the primary memory 3 are data read from a lower page or from an upper page (step S106).

In step S106, when determining that the data were read from a lower page of the primary memory 3, the determination unit 44 infers that "1" is the correct data bit and outputs the data bit "1" (step S107).

In step S106, when determining that the data were read from an upper page of the primary memory 3, the determination unit 44 infers that "0" is the correct data bit and outputs the data bit "0" (step S108).

FIG. 12 is a table illustrating several examples of processing by the error reduction unit 40. FIG. 12 shows examples of reading data from a lower page of the primary memory 3 and an upper page of the mirror memory 4.

In case 1, the lower page data bit of the primary memory 3 is "1" and the upper page data bit of the mirror memory 4 (data after bit re-flipping; the same holds below) is "1". In this case, the data match, and therefore the error reduction unit 40 infers that "1" is the correct data bit and outputs "1".

In case 2, the lower page data bit of the primary memory 3 is "1", and an error to change the upper page data bit of the mirror memory 4 from "1" to "0" (an error to change from "0" to "1" before bit re-flipping) has occurred. In this case, the data do not match, and the data of the primary memory 3 are data read from the lower page. Therefore, the error reduction unit 40 infers that "1" is the correct data bit and outputs "1". This inference is correct.

In case 3, an error to change the lower page data bit of the primary memory 3 from "1" to "0" has occurred, and the upper page data bit of the mirror memory 4 is "1". In this case, the data do not match, and the data of the primary memory 3 are data read from the lower page. Therefore, the error reduction unit 40 infers that "1" is the correct data bit and outputs "1". This inference is correct.

In case 4, an error to change the lower page data bit of the primary memory 3 from "1" to "0" has occurred, and an error to change the upper page data bit of the mirror memory 4 from "1" to "0" (an error to change from "0" to "1" before bit re-flipping) has occurred. In this case, the data match, and therefore the error reduction unit 40 infers that "0" is the correct data bit and outputs "0". This inference is not correct. In this way, when an error occurs in both the primary memory 3 and the mirror memory 4, the error reduction unit 40 cannot infer the correct value. The probability of an error occurring simultaneously in both the primary memory 3 and the mirror memory 4, however, is extremely low. Thus, the effect of not being able to make a correct inference in this case is small.

In case 5, the lower page data bit of the primary memory 3 is "0", and the upper page data bit of the mirror memory 4 is "0". In this case, the data match, and therefore the error reduction unit 40 infers that "0" is the correct data bit and outputs "0".

In the above explanation, an example has been provided of the reverse mirror unit 30 and the error reduction unit 40 working together to reduce the BER, yet the error reduction unit 40 alone may be used independently. When not using reverse mirroring, bit re-flipping is not performed in the error reduction unit 40. Furthermore, when not using reverse mirroring, the reverse mirror unit 30 does not require the buffer memory 5.

In the above explanation, an example has been provided of the dominant error direction being the direction illustrated in FIG. 10, yet this is merely an example. For example, even when the dominant error direction is opposite from the direction illustrated in FIG. 10, the above concept may be applied by using a similar approach to infer the correct data.

[Effects of Reverse Mirroring and Error Reduction]

Figure 13:
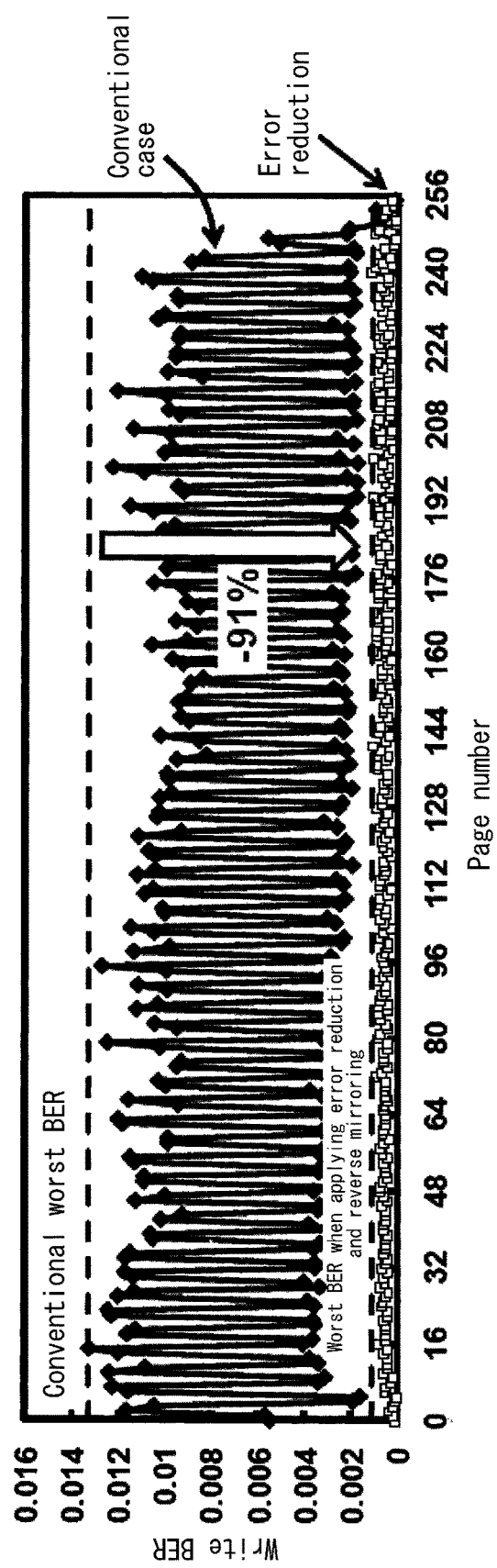
FIG. 13 is a graph illustrating improvement in BER when applying reverse mirroring and error reduction.

FIG. 13 is a graph comparing the write BERs, under conditions with write errors as the primary error source, for the case of a conventional technique using regular mirroring and for the case of applying the above reverse mirroring and error reduction. Black squares indicate measurement results for the conventional case, and white squares indicate measurement results upon applying reverse mirroring and error reduction. As illustrated in FIG. 13, the worst BER improved by 91% upon applying reverse mirroring and error reduction.

FIGS. 14A, 14B, 15A, and 15B show the measurement results for comparisons among the case of a conventional technique using regular mirroring, the case of applying the above reverse mirroring, and the case of applying the above reverse mirroring and error reduction. Black squares indicate measurement results for the conventional case, white triangles indicate measurement results for the case of applying reverse mirroring, and white squares indicate measurement results upon applying reverse mirroring and error reduction.

Figure 14A:
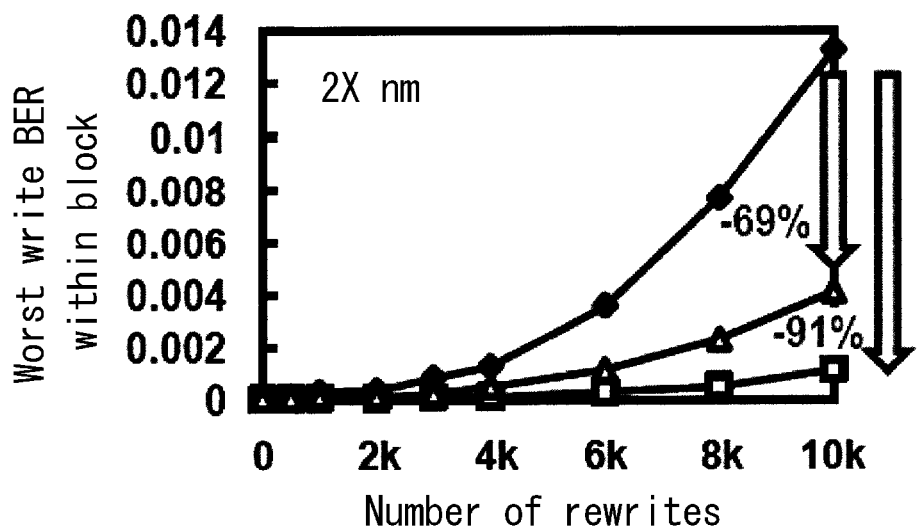
FIG. 14A is a graph comparing the dependency of write BER on the number of rewrites.
Figure 14B:
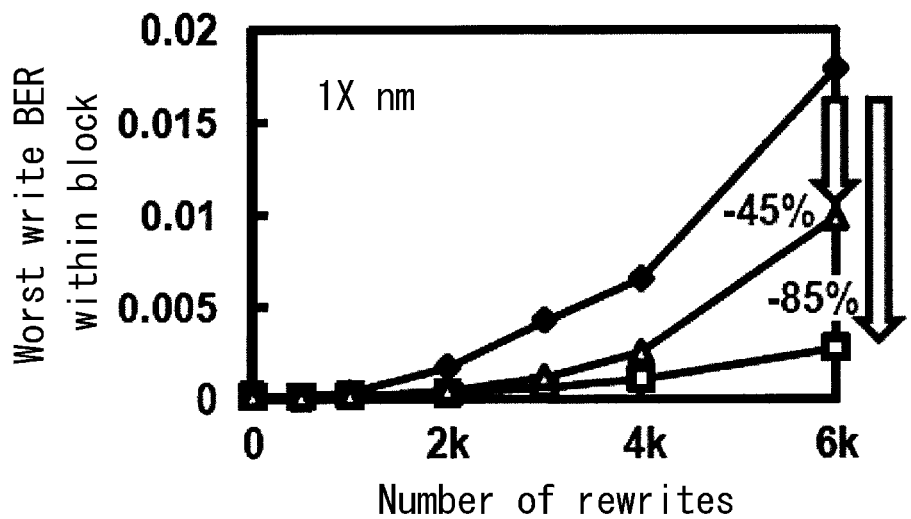
FIG. 14B is a graph comparing the dependency of write BER on the number of rewrites.

In FIGS. 14A and 14B, the horizontal axis indicates the number of rewrites and the vertical axis indicates the worst write BER within a block. FIG. 14A shows the measurement results for memory cells with a size of 2× nm. FIG. 14B shows the measurement results for memory cells with a size of 1× nm. A size of 2× nm refers to a size of approximately 20 nm to 30 nm. A size of 1× nm refers to a size of approximately 10 nm to 20 nm. The same holds in the explanation below.

As illustrated in FIG. 14A, when the number of rewrites was 10 k, the BER was reduced by 69% with respect to the conventional technique by applying reverse mirroring, and the BER was reduced by 91% with respect to the conventional technique by further applying error reduction in addition to reverse mirroring.

As illustrated in FIG. 14B, when the number of rewrites was 6 k, the BER was reduced by 45% with respect to the conventional technique by applying reverse mirroring, and the BER was reduced by 85% with respect to the conventional technique by further applying error reduction in addition to reverse mirroring.

In FIGS. 15A and 15B, the horizontal axis indicates the number of rewrites and the vertical axis indicates the worst data retention BER within a block. FIG. 15A shows the measurement results, for memory cells with a size of 2× nm, after letting 506 hours elapse at 85° C. after data had been rewritten the number of times designated on the horizontal axis. FIG. 15B shows the measurement results, for memory cells with a size of 1× nm, after letting 194 hours elapse at 85° C. after data had been rewritten the number of times designated on the horizontal axis.

As illustrated in FIG. 15A, when the number of rewrites was 10 k, the BER was reduced by 41% with respect to the conventional technique by applying reverse mirroring, and the BER was reduced by 56% with respect to the conventional technique by further applying error reduction in addition to reverse mirroring.

As illustrated in FIG. 15B, when the number of rewrites was 6 k, the BER was reduced by 14% with respect to the conventional technique by applying reverse mirroring, and the BER was reduced by 30% with respect to the conventional technique by further applying error reduction in addition to reverse mirroring.

[Shift Mirroring]

Figure 16:
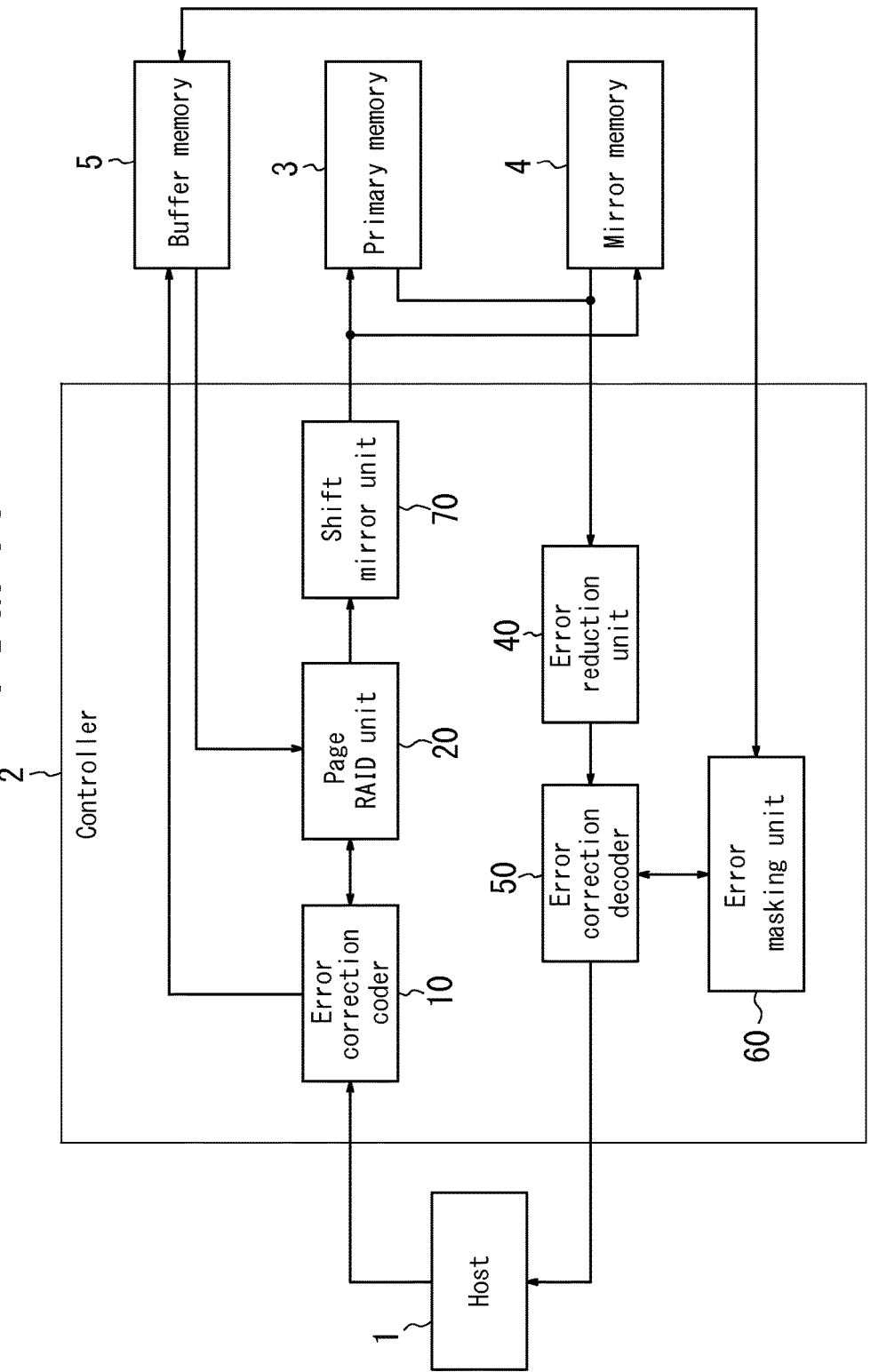
FIG. 16 schematically illustrates the structure of a semiconductor storage device according to another one of the disclosed embodiments.

Instead of the above-described "reverse mirroring", the following describes an embodiment that adopts "shift mirroring". FIG. 16 schematically illustrates the structure of a semiconductor storage device according to an embodiment adopting shift mirroring. This semiconductor storage device differs from the semiconductor storage device, illustrated in FIG. 1, that adopts "reverse mirroring" in that the controller 2 includes a shift mirror unit 70 instead of the reverse mirror unit 30 and in that the shift mirror unit 70 is not connected to the buffer memory 5.

Figure 17:
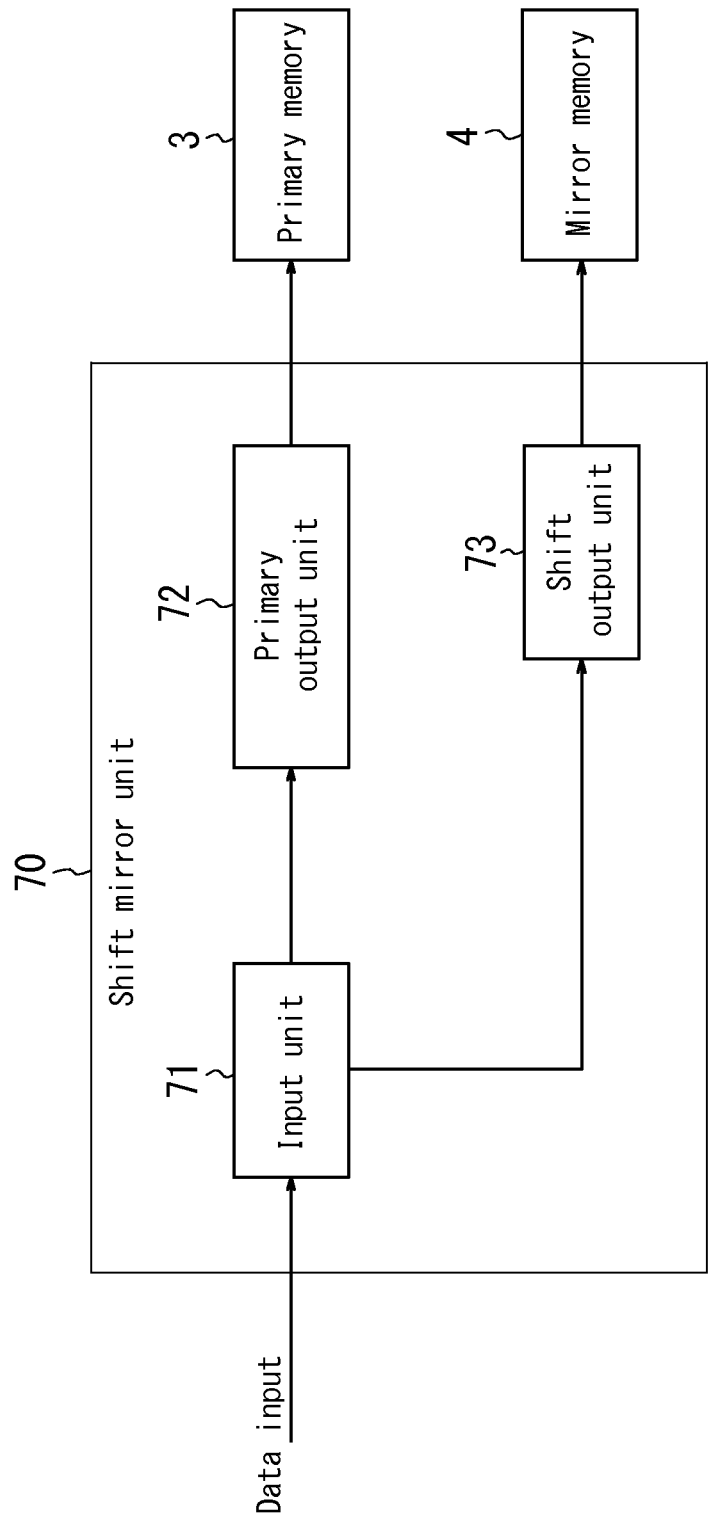
FIG. 17 schematically illustrates the structure of the shift mirror unit in FIG. 16.

FIG. 17 schematically illustrates the structure of the shift mirror unit 70 according to one of the disclosed embodiments. As illustrated in FIG. 17, the shift mirror unit 70 includes an input unit 71, a primary output unit 72, and a shift output unit 73.

Upon receiving data, the input unit 71 provides the primary output unit 72 and the shift output unit 73 with the data. The primary output unit 72 stores the received data without change in the primary memory 3.

The shift output unit 73 shifts the page storing data by a shift number i (i being an integer) from the page stored in the primary memory 3 by the primary output unit 72 and then stores the received data in the mirror memory 4.

The following describes, in detail, the shift output unit 73 shifting the page that stores the data by the shift number i.

Figure 18:
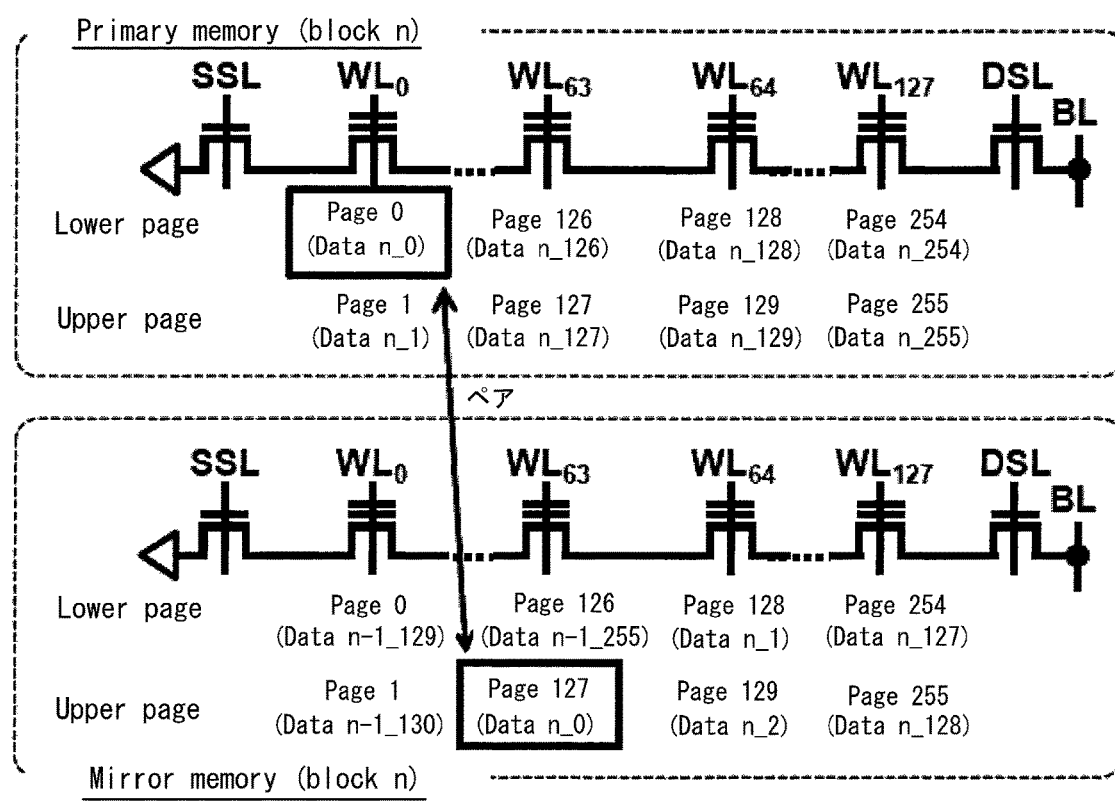
FIG. 18 illustrates an example of storing data in the primary memory and the mirror memory by shift mirroring.

FIG. 18 illustrates an example of shifting the page that stores data in the mirror memory 4 by a predetermined shift number from the page that stores data in the primary memory 3. A unit composed of 128 memory cells in the bit line direction, as illustrated in FIG. 18, is referred to below as a "block". As illustrated in FIG. 18, in block n (the $n^{th}$ block) of the primary memory 3, data n_0 to data n_255 are stored in page 0 to page 255. On the other hand, in block n of the mirror memory 4, the corresponding data are stored in pages that are shifted by a predetermined shift number. For example, data n_0 to data n_128 are stored in page 127 to page 255. Data n_129 to n_255 are stored in the non-illustrated block n+1 of the mirror memory 4. The data stored in page 0 to page 126 in block n of the mirror memory 4 are data n−1_129 to data n−1_255 stored in page 129 to page 255 in block n−1 of the primary memory 3.

Figure 19:
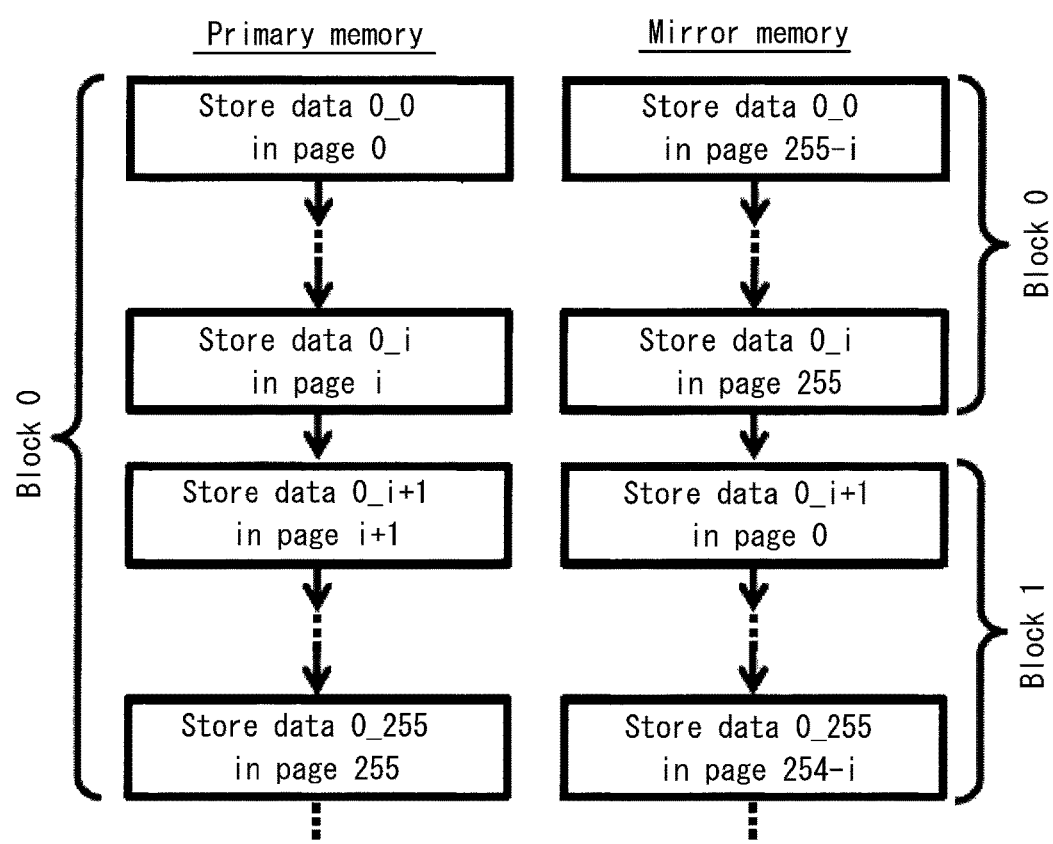
FIG. 19 illustrates an example of processing to store data in the primary memory and the mirror memory by shift mirroring.

FIG. 19 illustrates an example of processing to shift and store a page storing data in the mirror memory 4 from a page storing data in the primary memory 3. When storing data 0_0 in page 0 within block 0 of the primary memory 3, the data 0_0 are stored in page 255-i of block 0 in the mirror memory 4. When storing data 0_i in page i within block 0 of the primary memory 3, the data 0_i are stored in page 255 of block 0 in the mirror memory 4. When storing data 0_i+1 in page i+1 within block 0 of the primary memory 3, the data 0_i+1 are stored in page 0 of block 1 in the mirror memory 4. When storing data 0_255 in page 255 within block 0 of the primary memory 3, the data 0_255 are stored in page 254-i of block 1 in the mirror memory 4.

As illustrated in FIG. 19, the shift mirror unit 70 can simultaneously write the same data in the primary memory 3 and the mirror memory 4. Therefore, the buffer memory 5 is unnecessary.

The shift number i may be set to any value, and an appropriate value may be set in accordance with the characteristics of the primary memory 3 and the mirror memory 4.

Figure 20A:
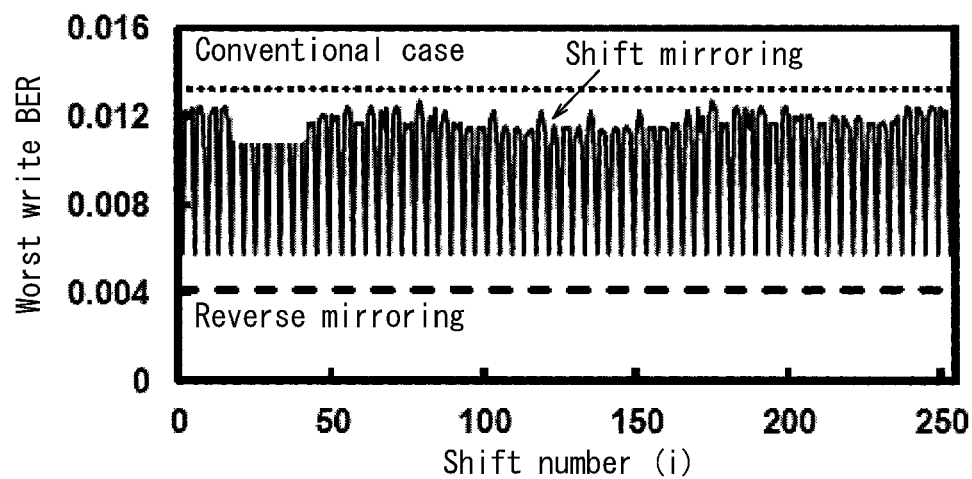
FIG. 20A illustrates the dependency of the worst write BER on the shift number.

FIG. 20A is a graph comparing the worst write BERs for a conventional case, for the case of applying reverse mirroring, and for the case of applying shift mirroring. The horizontal axis represents the shift number. The worst write BER for the case of applying shift mirroring varies cyclically depending on the shift number. In the case of adopting shift mirroring, by selecting a shift number that lowers the worst write BER, it is possible to achieve an improvement in the worst write BER equivalent to the case of adopting reverse mirroring.

Figure 20B:
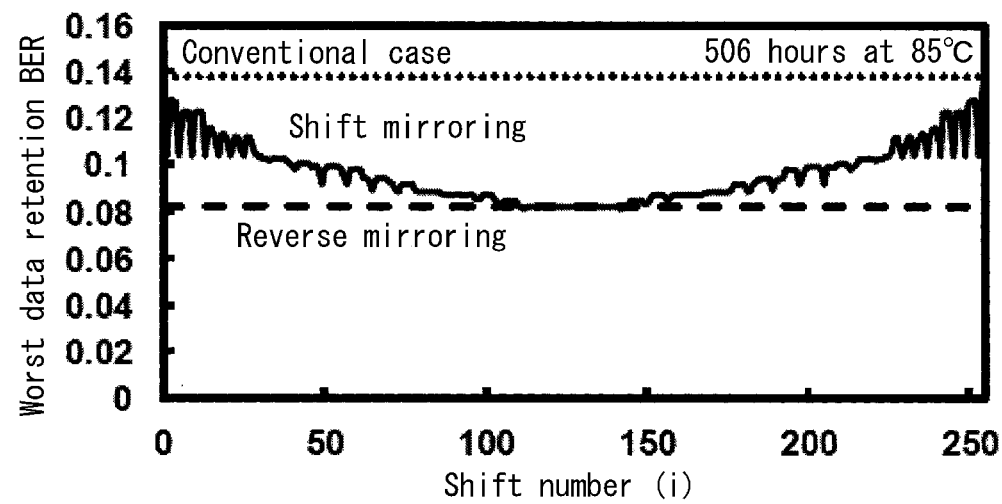
FIG. 20B illustrates the dependency of the worst data retention BER on the shift number.

FIG. 20B is a graph comparing the worst data retention BERs for a conventional case, for the case of applying reverse mirroring, and for the case of applying shift mirroring. The horizontal axis represents the shift number. The worst data retention BER for the case of applying shift mirroring varies depending on the shift number. As illustrated in FIG. 20B, in the case of adopting shift mirroring, an improvement in the worst data retention BER equivalent to the case of adopting reverse mirroring was achieved when the shift number was in the range of approximately 110 to 144.

Figure 21A:
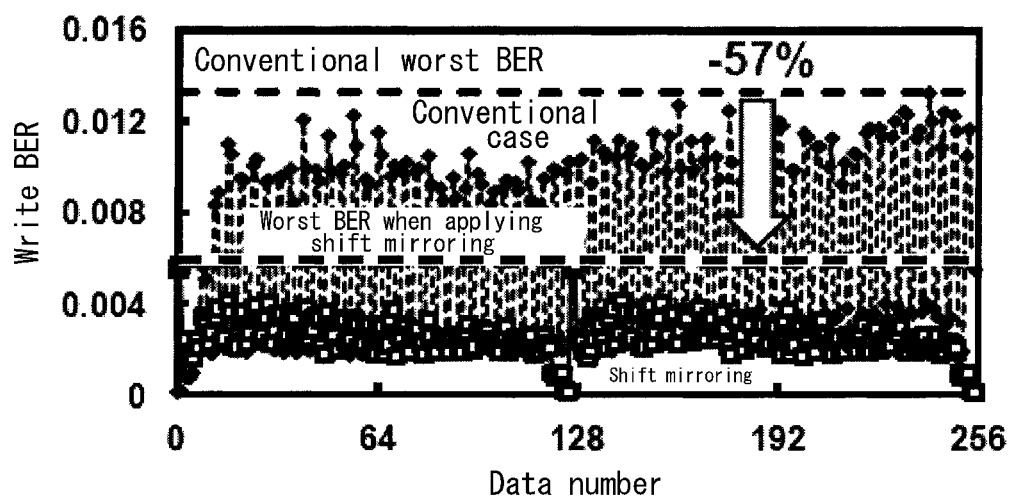
FIG. 21A is a graph illustrating improvement in write BER when applying shift mirroring.

FIG. 21A is a graph comparing the write BERs for a conventional case and for the case of applying shift mirroring. Black squares indicate measurement results for the conventional case, and white squares indicate measurement results upon applying shift mirroring. As illustrated in FIG. 21A, the worst BER improved by 57% upon applying shift mirroring.

Figure 21B:
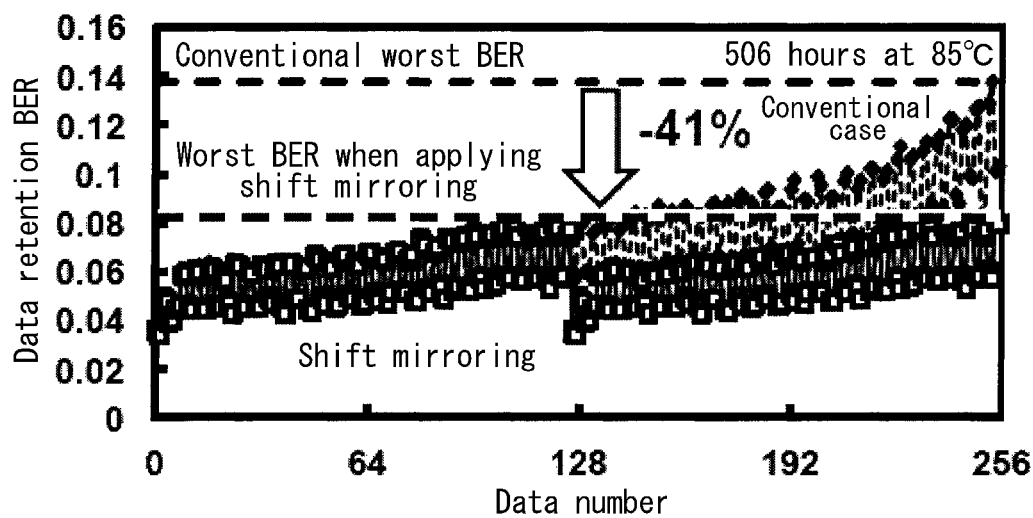
FIG. 21B is a graph illustrating improvement in data retention BER when applying shift mirroring.

FIG. 21B is a graph comparing the data retention BERs for a conventional case and for the case of applying shift mirroring. Black squares indicate measurement results for the conventional case, and white squares indicate measurement results upon applying shift mirroring. As illustrated in FIG. 21B, the worst BER improved by 41% upon applying shift mirroring.

By thus applying shift mirroring to shift the page storing data in the mirror memory 4 by an appropriate shift number i from the page storing data in the primary memory 3, it is possible to improve the worst BER without using the buffer memory 5.

When shifting pages storing data in the mirror memory 4 from pages storing data in the primary memory 3, it is not necessary to shift pages uniformly. This is because the optimal method of storing data may change depending on the characteristics of the primary memory 3 and the mirror memory 4. For example, for optimal data storage, the pages storing data in the mirror memory 4 may be partially reordered from a uniform shift.

[Page RAID]

Figure 22:
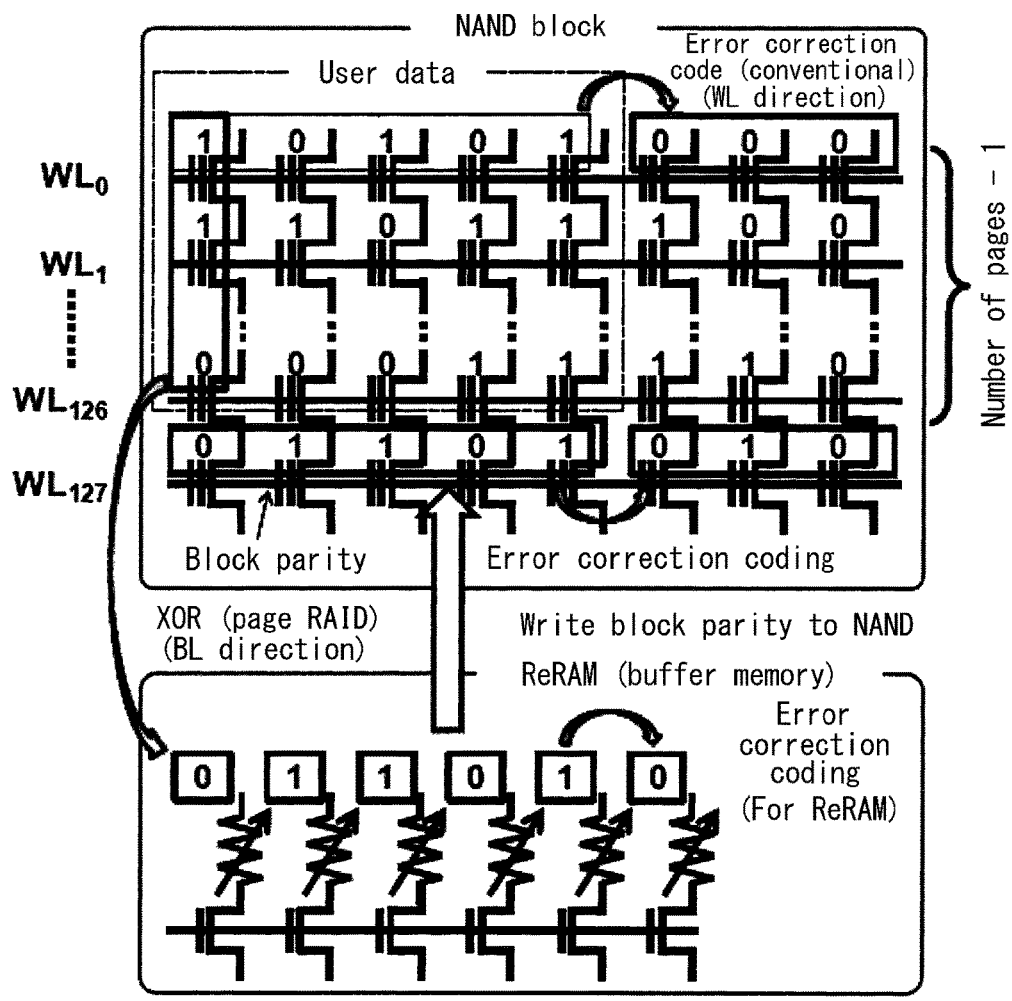
FIG. 22 illustrates the page RAID unit, according to one of the disclosed embodiments, generating parity bits in the bit line direction.

FIG. 22 illustrates the page RAID unit 20 adding parity bits in the Bit Line (BL) direction.

As illustrated in FIG. 22, in addition to conventional error correction coding in the Word Line (WL) direction, the page RAID unit 20 calculates parity bits by performing an exclusive OR operation on the data in each memory cell in the bit line direction as well. The page RAID unit 20 stores the calculated parity bits in the buffer memory 5.

The page RAID unit 20 calculates parity bits in the bit line direction each time a page of user data is written to the error correction coder 10 and stores the calculated parity bits in the buffer memory 5. The buffer memory 5 has storage capacity of at least one page, updating and storing one page of parity bits. ReRAM that can be rewritten a large number of times is preferably used for the buffer memory 5.

Once the writing of user data is complete, the page RAID unit 20 writes the parity bits stored in the buffer memory 5 into the page following the user data that was completely written. Parity bits may be written into the last page (the page with the largest page number) yet are not limited to the last page. Parity bits may also be written into the second to last page or a different page. Writing of parity bits is not limited to one page, and parity bits may be written into a plurality of pages.

Until writing of user data is complete, the page RAID unit 20 updates the buffer memory 5 a maximum of (number of pages−1) times. Here, the number of pages refers to the number of pages in a block. In the example illustrated in FIG. 22, there are 128 memory cells on one bit line, and each memory cell has two pages. Hence, the number of pages is 256.

If the NAND block can be rewritten 4 k times, the buffer memory 5 needs to be rewritable 4 k×255=approximately $10^6$ times. ReRAM can be rewritten many times and therefore may be adopted as the buffer memory 5.

Since the page RAID unit 20 frequently writes to the buffer memory 5, a fast write speed is preferable from the perspective of write access time. From this perspective as well, ReRAM is preferably used for the buffer memory 5.

Figure 23A:
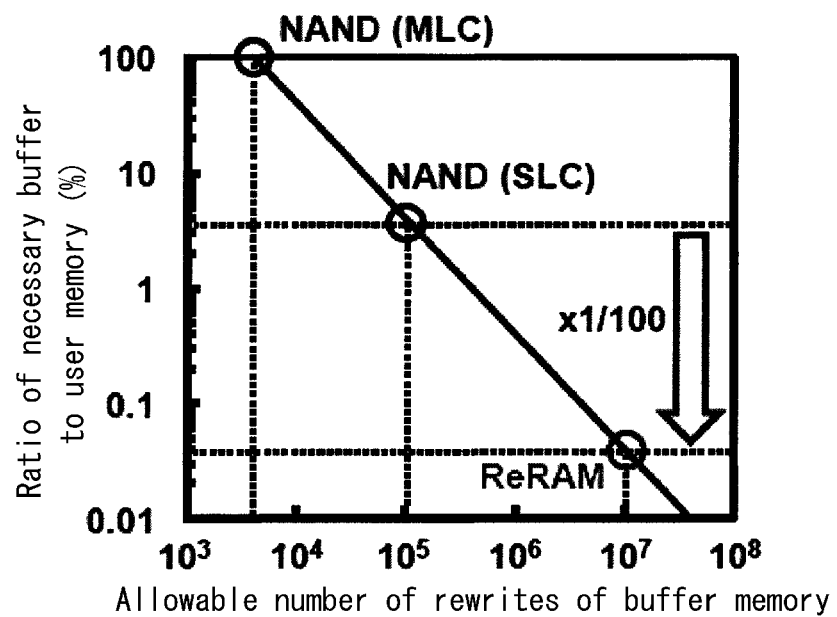
FIG. 23A illustrates the dependency of the buffer ratio necessary for user memory on the allowable number of rewrites of the buffer memory.

FIG. 23A is a graph in which the horizontal axis represents the allowable number of rewrites of the buffer memory 5 and the vertical axis represents the ratio of the necessary buffer memory 5 to the user memory. As illustrated in FIG. 23A, ReRAM can be rewritten approximately 100 times as often as SLC NAND, and the necessary buffer ratio is approximately 1/100. When adopting ReRAM for the buffer memory 5, the necessary capacity is 0.1% or less of the user memory.

Figure 23B:
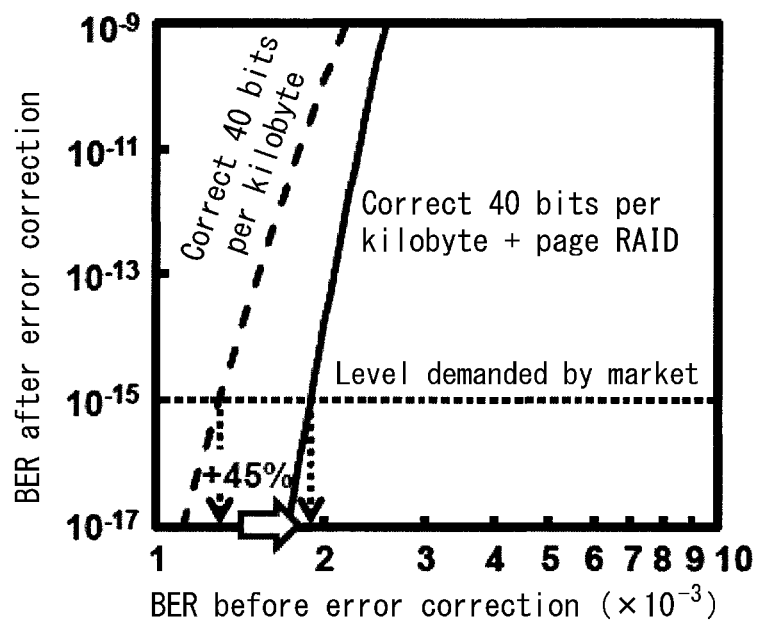
FIG. 23B is a graph comparing the dependency of the BER after error correction on the BER before error correction.

FIG. 23B is a graph in which the horizontal axis represents the BER before error correction, and the vertical axis represents the BER after error correction. As illustrated in FIG. 23B, the BER after error correction that is requested by the market is on the level of $10^{-15}$. Upon examination under the assumption of correcting 40 bits per kilobyte, the allowable BER when adopting page RAID increases by 45%. The allowable BER refers to the BER before error correction that allows for a BER of $10^{-15}$ to be attainted after error correction.

[Error Masking]

Figure 24:
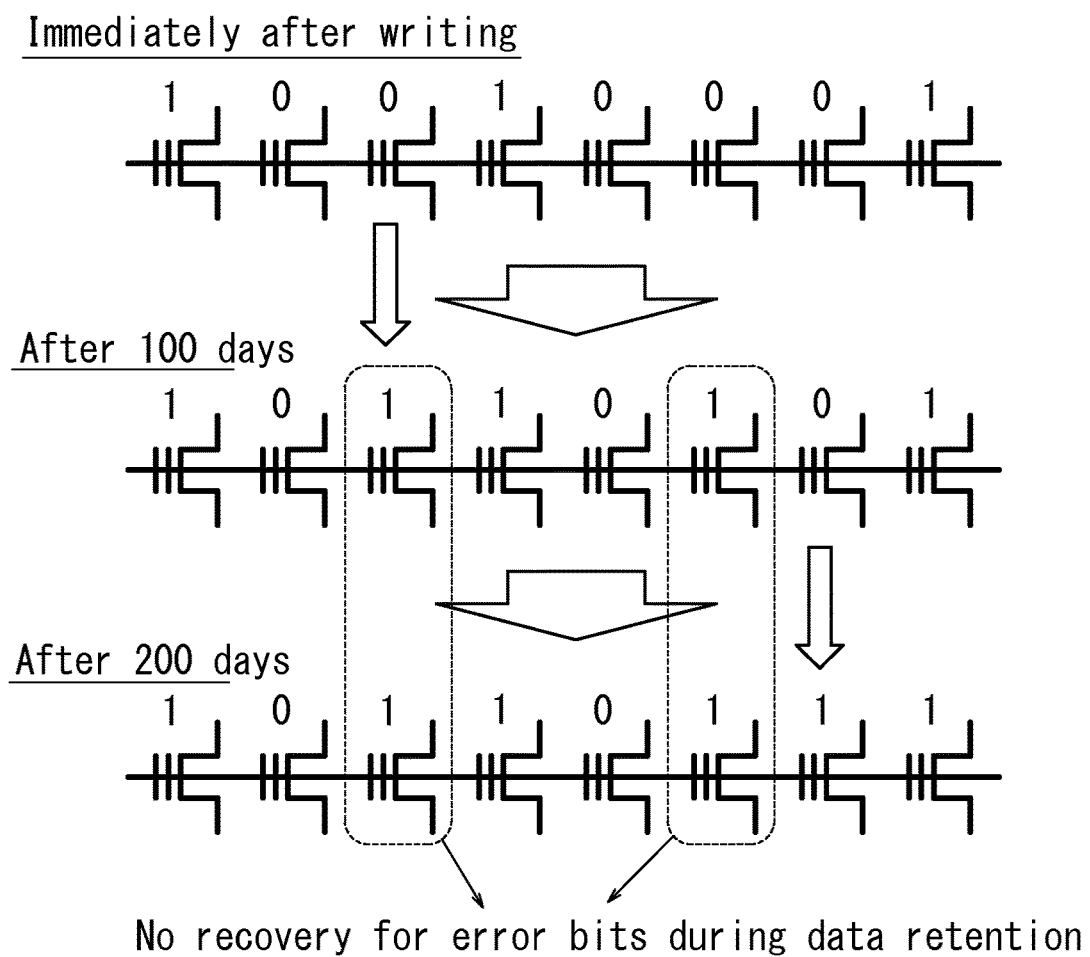
FIG. 24 illustrates an example of the occurrence of data retention errors in NAND flash memory.

FIG. 24 illustrates the occurrence of data retention errors in NAND flash memory. Data retention errors occur for reasons such as electrons leaking from the floating gate. In the example illustrated in FIG. 24, upon 100 days elapsing after data are written, an error has occurred in the third memory cell from the left and in the third memory cell from the right, and the "0" originally stored in each of these memory cells has become a "1". Once an error has occurred, the affected memory cell does not recover. Therefore, after 200 days have elapsed, the third memory cell from the left and the third memory cell from the right remain in the state of error. In the example illustrated in FIG. 24, after 200 days have elapsed, an error has also occurred in the second data bit from the right, which has gone from "0" to "1".

In light of such data retention error characteristics of NAND flash memory, the controller 2 performs efficient error correction decoding. During error masking, the controller 2 performs two sequences: an error writing sequence and an error masking sequence. Each sequence is described below.

Figure 25:
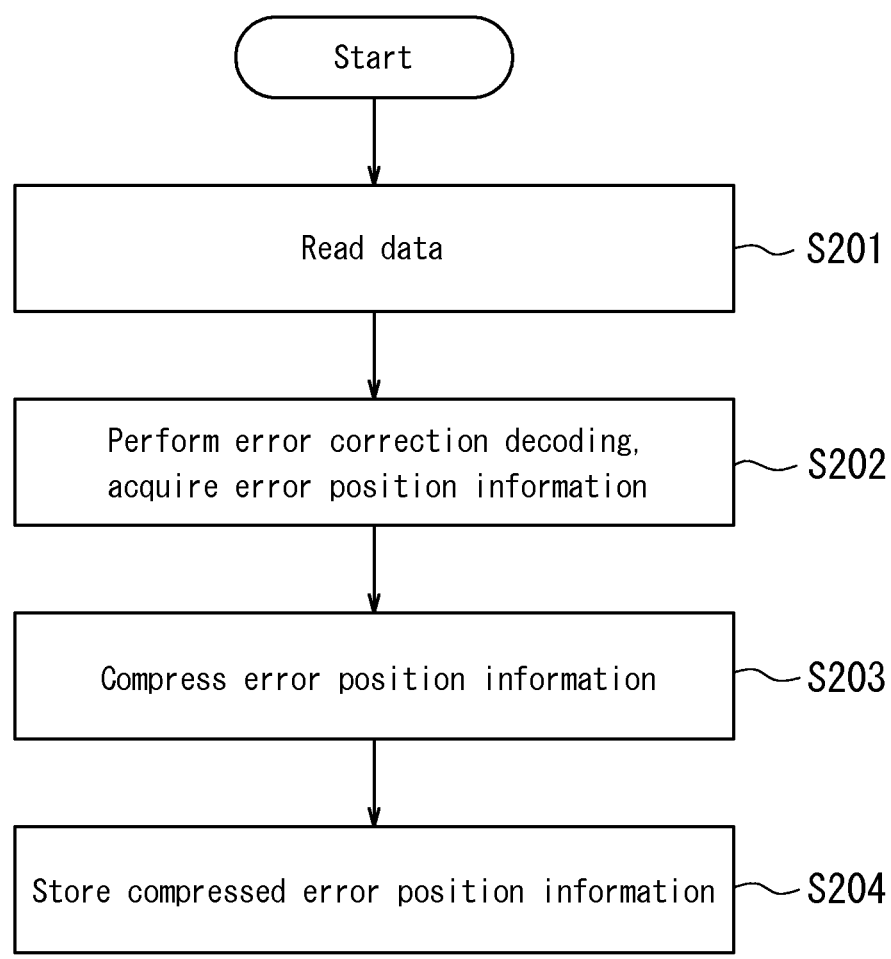
FIG. 25 is a flowchart of a writing sequence in the controller according to one of the disclosed embodiments.

FIG. 25 is a flowchart illustrating the error writing sequence.

The error correction decoder 50 reads data on which error correction coding has been performed (step S201). The error correction decoder 50 applies error correction decoding to the read data and outputs the data resulting from error correction decoding. At this time, the error correction decoder 50 acquires information on the position of memory cells in which an error has occurred (referred to below as "error position information") (step S202).

The error masking unit 60 acquires the error position information from the error correction decoder 50 and compresses the acquired error position information (step S203). An example of the compression method used by the error masking unit 60 is described below. The error masking unit 60 may acquire the error position information with a different method. For example, the error masking unit 60 may acquire the error position information by comparing data separately written into a highly reliable memory (for example, the buffer memory 5) and data read from the primary memory 3, the mirror memory 4, or the like.

The error masking unit 60 stores the compressed error position information in the buffer memory 5 (step S204).

Figure 26:
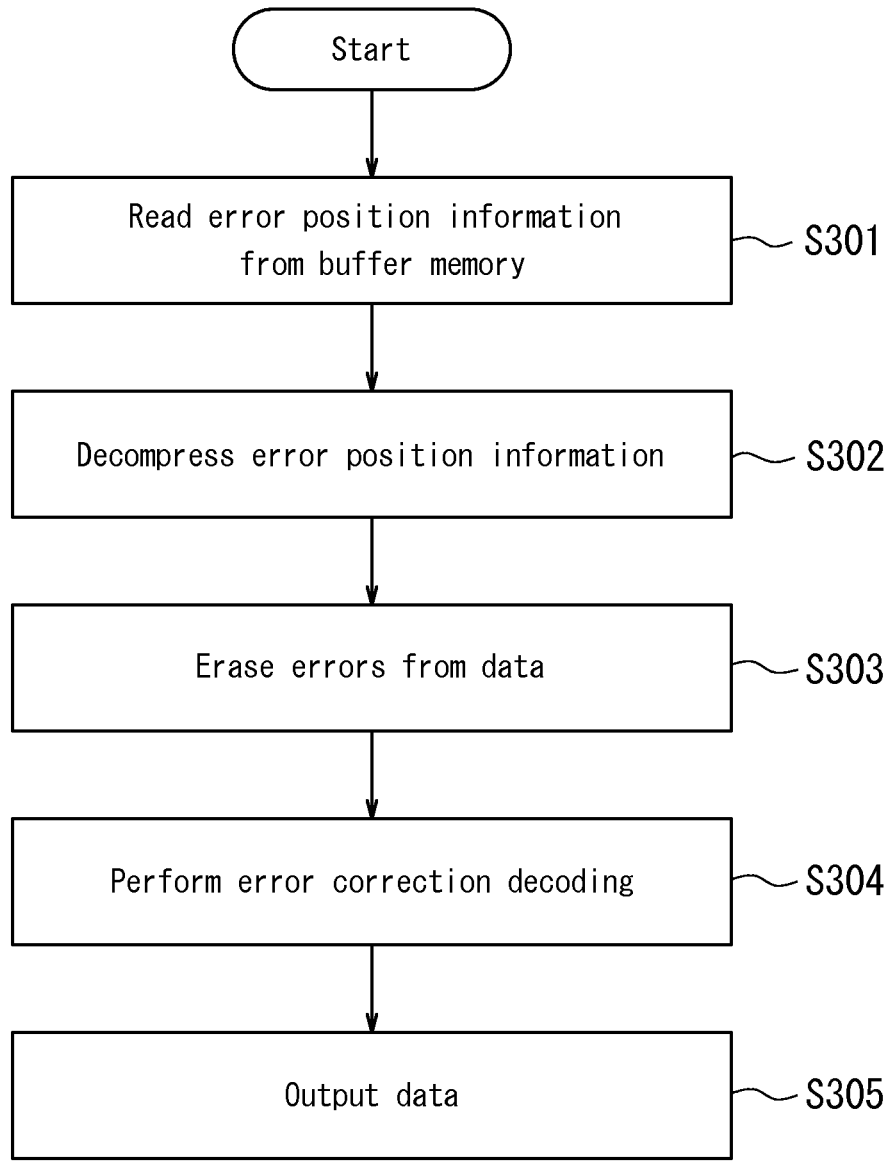
FIG. 26 is a flowchart of an error masking sequence in the controller according to one of the disclosed embodiments.

FIG. 26 is a flowchart illustrating the error masking sequence.

The error masking unit 60 reads the previous compressed error position information from the buffer memory 5 (step S301). The error masking unit 60 then decompresses the compressed error position information (step S302).

The error correction decoder 50 acquires the error position information from the error masking unit 60 and erases errors in the data (step S303). The error correction decoder 50 performs error correction decoding (step S304). The error correction decoder 50 then outputs the data resulting from error correction decoding (step S305).

By performing the error writing sequence and the error masking sequence at the appropriate timing, the controller 2 can effectively perform error masking. For example, the error writing sequence may be performed when reading data up until a predetermined time has elapsed since the data were written, and the error masking sequence may be performed when reading data after a predetermined time has elapsed. When reading data after a predetermined time has elapsed, the controller 2 may also perform both the error writing sequence and the error masking sequence.

Figure 27:
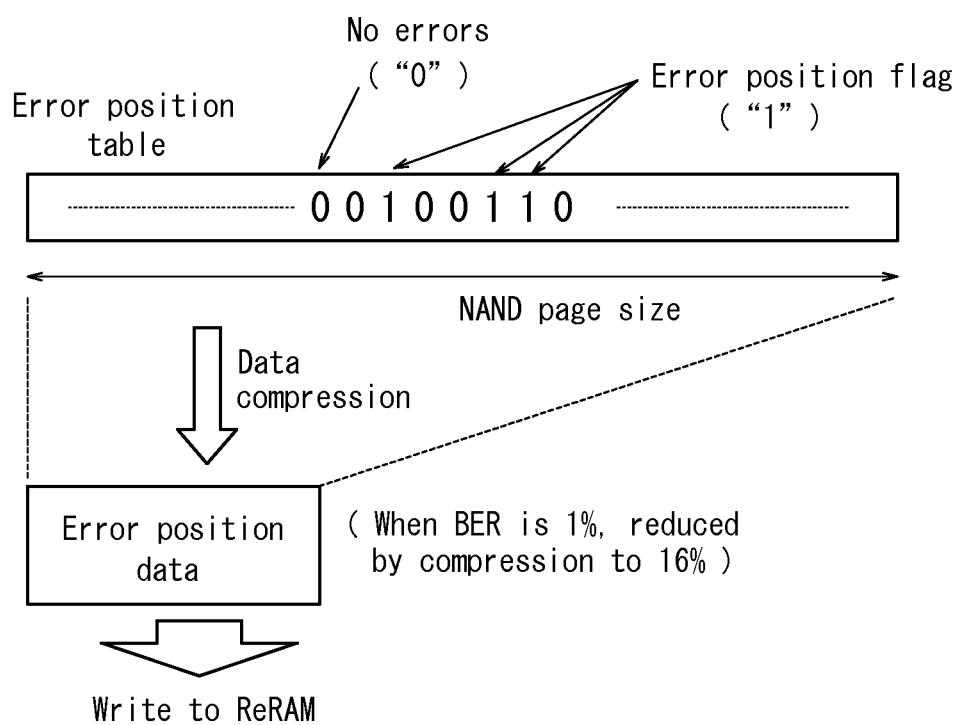
FIG. 27 illustrates an example of the error masking unit, according to one of the disclosed embodiments, compressing error position information.

FIG. 27 illustrates an example of the error masking unit 60 compressing the error position information. Normally, the probability of an error occurring in a memory cell is small. Therefore, the error masking unit 60 can use this fact to compress the error position information efficiently. The error position information is a table in which positions without an error are "0", and positions in which an error has occurred are "1". Normally, the occurrence rate of errors is low, resulting in the error position information being "0" in most positions, with few positions being "1".

For example, by using run length encoding to compress error position information in which certain information is continuous in this way, the error masking unit 60 can achieve efficient compression. When the BER is 1%, for example, the amount of data can be reduced to 16% with run length encoding. Run length encoding is only an example, and a different compression method may be used.

Figure 28:
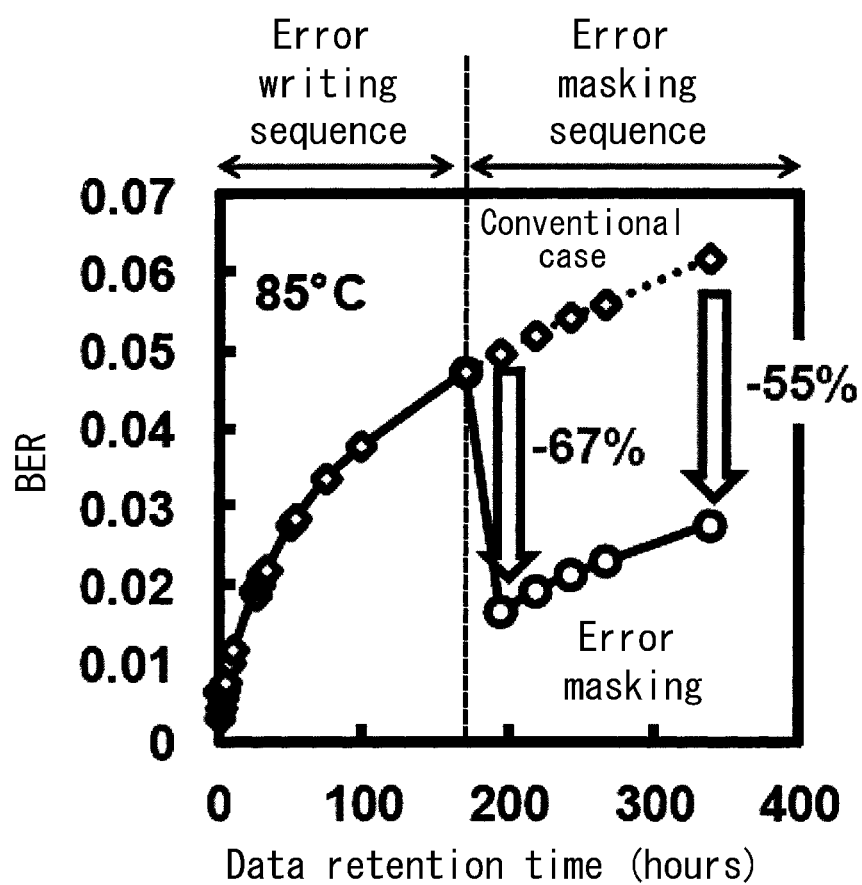
FIG. 28 is a graph comparing the dependency of BER on data retention time.

FIG. 28 is a graph of the BER comparing the case of applying error masking and the case of not applying error masking. As illustrated in FIG. 28, by applying error masking in the error masking sequence, the BER improves by 67% upon a comparison after setting the temperature to 85° C. and allowing 200 hours to elapse, and the BER improves by 55% upon a comparison after setting the temperature to 85° C. and allowing 350 hours to elapse.

The error masking unit 60 has been described as compressing the error position information, yet such compression is not essential. The error masking unit 60 may store the error position information in the buffer memory 5 without compressing the error position information.

The error position information has been described above as being stored in the buffer memory 5, yet this is only an example. The error position information may be stored in another memory, such as the primary memory 3, the mirror memory 4, or the like.

[Measurement Results]

Figure 29:
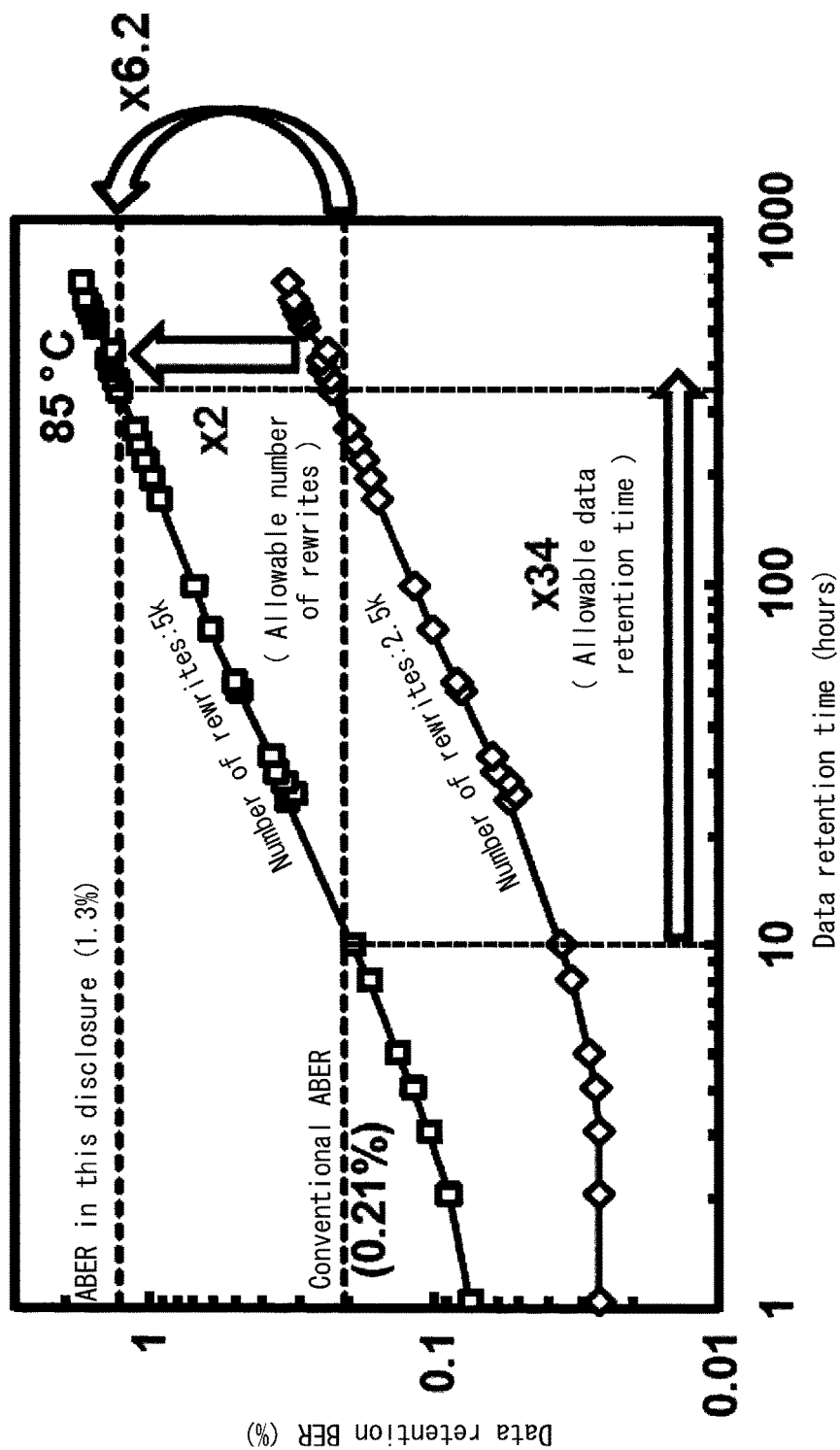
FIG. 29 is a graph illustrating the dependency of data retention BER on data retention time.

Upon applying the reverse mirroring, error reduction, page RAID, and error masking described in this disclosure, the acceptable BER (ABER) increases by a factor of 6.2 in terms of the data retention BER. As illustrated in FIG. 29, this corresponds to an increase by a factor of 2 in the allowable number of rewrites and to an increase by a factor of 34 in the allowable data retention time.

Figure 30:
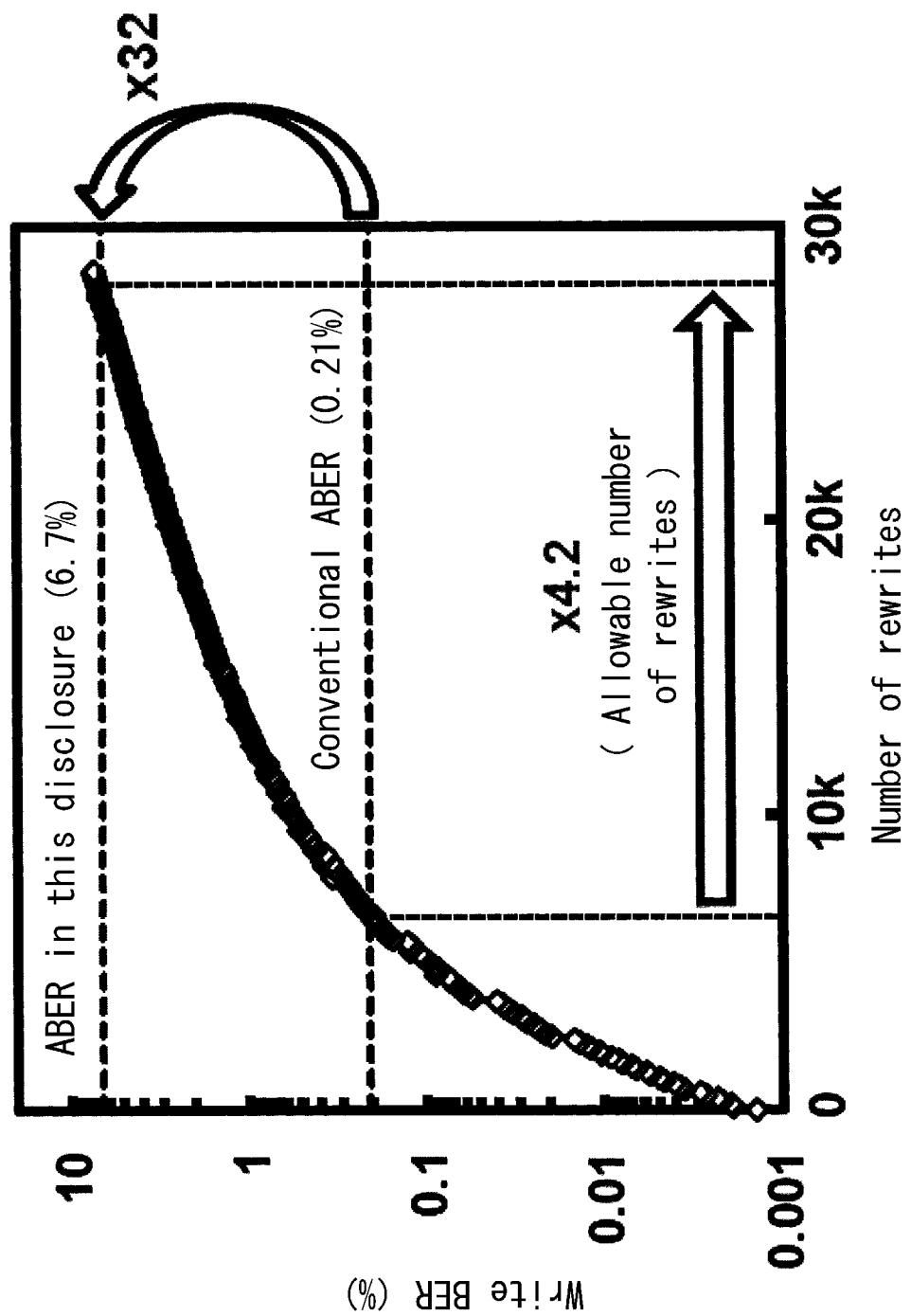
FIG. 30 is a graph illustrating the dependency of write BER on the number of rewrites.
Figure 32:
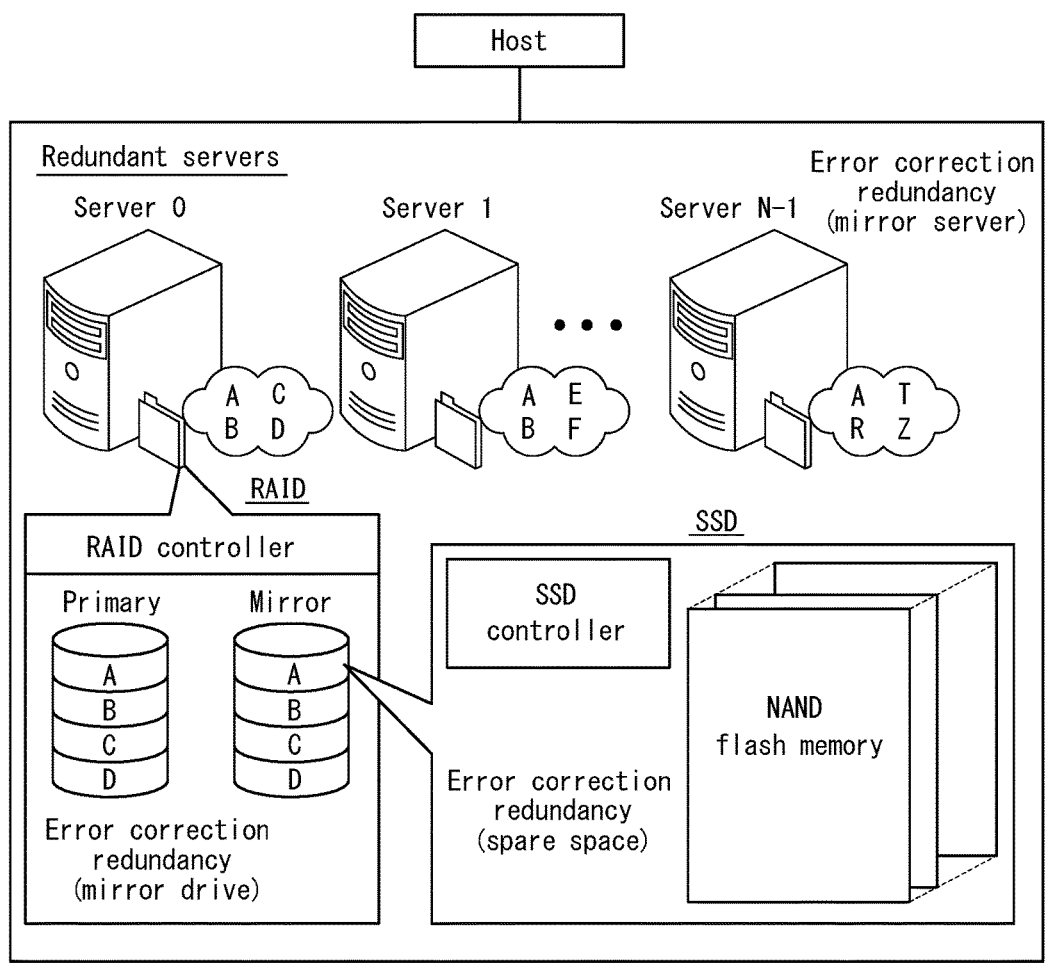
FIG. 32 is an example of the structure of a conventional storage system.

Furthermore, upon applying the reverse mirroring, error reduction, page RAID, and error masking described in this disclosure, the ABER increases by a factor of 32 in terms of the write BER. As illustrated in FIG. 30, this corresponds to an increase by a factor of 4.2 in the allowable number of rewrites.

FIG. 31 is a table summarizing the values described in FIGS. 29 and 30.

As described above, by improving the ABER, our semiconductor storage device increases reliability and can efficiently control an SSD at one hierarchical level.

By applying reverse mirroring and reading data from whichever of the primary memory 3 and the mirror memory 4 has a smaller BER, our semiconductor storage device can also improve the worst BER.

Furthermore, our semiconductor storage device applies error reduction, and when the data read from the primary memory 3 and the mirror memory 4 do not match, uses asymmetry in the error direction in NAND flash memory to infer the correct data, thereby allowing for improvement of the worst BER.

By applying page RAID and adding parity bits in the bit line direction as well, our semiconductor storage device can also improve the error correction capability.

Furthermore, by applying error masking and using error position information for when data were previously read, our semiconductor storage device can improve the worst BER.

Although the explanation in this disclosure is based on drawings and examples, it is to be noted that various changes and modifications will be apparent to those skilled in the art based on this disclosure. Therefore, such changes and modifications are to be understood as included within the scope of this disclosure.

For example, one of the disclosed embodiments uses the example of NAND flash memory, yet this disclosure is not limited to NAND flash memory. Any other memory with similar characteristics may be used.

As the NAND flash memory, an example has been described of NAND flash memory that is MLC with two bits per memory cell and page numbers from 0 to 255, yet this example is not limiting. NAND flash memory with a different configuration may be used.

Furthermore, an example has been described of applying reverse mirroring, error reduction, page RAID, and error masking with a device configuration allowing for the application of all of these techniques, yet control that only applies one or more of these techniques with a device configuration allowing for the application of one or more of these techniques is also contemplated. In this case, a person of skill in the art may omit unnecessary blocks in accordance with common technical knowledge. For example, mirroring is not essential when applying only page RAID, and hence in this case the mirror memory 4 may be omitted. Similarly, mirroring is not essential when applying only error masking, and hence in this case the mirror memory 4 may be omitted.

Our devices and methods may be applied not only to controlling an SSD with one hierarchical level but also to a configuration with a plurality of hierarchical levels.

REFERENCE SIGNS LIST

1 Host
2 Controller
3 Primary memory
4 Mirror memory
5 Buffer memory
10 Error correction coder
20 Page RAID unit
30 Reverse mirror unit
31 Input unit
32 Primary output unit
33 Conversion unit
34 Mirror output unit
40 Error reduction unit
41 Primary input unit
42 Mirror input unit
43 Bit re-flipping unit
44 Determination unit
50 Error correction decoder
60 Error masking unit
70 Shift mirror unit
71 Input unit
72 Primary output unit
73 Shift output unit

The invention claimed is:

1. A semiconductor storage device comprising:
a primary memory;
a mirror memory storing data corresponding to data stored in the primary memory; and
a controller,
wherein the controller comprises:
a reverse mirror unit configured to store received data in the primary memory and the mirror memory, wherein the reverse mirror unit
stores the received data without change in the primary memory, and
stores the received data in the mirror memory after reordering and flipping bits of the received data; and
an error reduction unit configured to read data from the primary memory and the mirror memory,
wherein the error reduction unit
reads first data from the primary memory,
reads second data corresponding to the first data from the mirror memory and flips bits of the second data,
outputs the first data when the first data and the second data match, and
infers, when the first data and the second data do not match, that a bit error occurred in a dominant direction in one of the first data and the second data, infers data to be correct based on a position from which the first data were read from the primary memory, and outputs the data inferred to be correct.

2. The semiconductor storage device of claim 1, wherein the primary memory and the mirror memory are a multi-level flash memory.

3. The semiconductor storage device of claim 1, further comprising:
a buffer memory,
wherein the controller further comprises:
an error correction coder configured to perform error correction coding on data received from a host;
a page RAID unit configured to calculate a parity bit in a bit line direction and store the parity bit in the buffer memory each time a page of data is written to the error correction coder;
an error correction decoder configured to perform error correction decoding on data received from the error reduction unit; and
an error masking unit configured to receive, from the error correction decoder, error position information acquired upon error correction decoding,
wherein the error masking unit
stores the error position information in one of the buffer memory, the primary memory, and the mirror memory, and
reads the error position information from one of the buffer memory, the primary memory, and the mirror memory and provides the error position information to the error correction decoder when the error correction decoder performs error correction decoding on data.

4. A semiconductor storage device comprising:
a primary memory;
a mirror memory storing data corresponding to data stored in the primary memory;
a buffer memory; and
a controller,
wherein the controller comprises:
an error correction coder configured to perform error correction coding on data received from a host;
a page RAID unit configured to calculate a parity bit in a bit line direction and store the parity bit in the buffer memory each time a page of data is written to the error correction coder;
a reverse mirror unit configured to store data received from the page RAID unit in the primary memory and the mirror memory, wherein the reverse mirror unit
stores the received data without change in the primary memory, and
stores the received data in the mirror memory after reordering the received data;
an error reduction unit configured to read data from the primary memory and the mirror memory,
wherein the error reduction unit
reads first data from the primary memory,
reads second data corresponding to the first data from the mirror memory,
outputs the first data when the first data and the second data match, and
outputs data, when the first data and the second data do not match, obtained by inferring that a bit error occurred in a dominant direction in one of the first data and the second data;
an error correction decoder configured to perform error correction decoding on data received from the error reduction unit; and
an error masking unit configured to receive, from the error correction decoder, error position information acquired upon error correction decoding,
wherein the error masking unit
stores the error position information in one of the buffer memory, the primary memory, and the mirror memory, and
reads the error position information from one of the buffer memory, the primary memory, and the mirror memory and provides the error position information to the error correction decoder when the error correction decoder performs error correction decoding on data,
wherein the primary memory and the mirror memory are a multi-level flash memory.

* * * * *